(12) United States Patent
Amako et al.

(10) Patent No.: US 6,946,620 B2
(45) Date of Patent: Sep. 20, 2005

(54) LASER PROCESSING METHOD AND LASER PROCESSING APPARATUS

(75) Inventors: Jun Amako, Matsumoto (JP); Kazuhiro Nishida, Matsumoto (JP); Kimio Nagasaka, Nirasaki (JP)

(73) Assignee: Seiko Epson Corporation, Tokyo (JP)

(*) Notice: Subject to any disclaimer, the term of this patent is extended or adjusted under 35 U.S.C. 154(b) by 93 days.

(21) Appl. No.: 10/453,588

(22) Filed: Jun. 4, 2003

(65) Prior Publication Data

US 2003/0205564 A1 Nov. 6, 2003

Related U.S. Application Data

(62) Division of application No. 10/235,934, filed on Sep. 6, 2002, now Pat. No. 6,642,480.

(30) Foreign Application Priority Data

Sep. 11, 2001 (JP) .......................... 2001-275487
Feb. 14, 2002 (JP) .......................... 2002-036624
Jun. 11, 2002 (JP) .......................... 2002-169742

(51) Int. Cl.[7] .......................... B23K 26/073
(52) U.S. Cl. .......................... 219/121.75
(58) Field of Search .............. 228/121.75, 121.67, 228/121.68, 121.69, 121.7, 121.71, 121.72, 121.76; 359/355, 350

(56) References Cited

U.S. PATENT DOCUMENTS

| | | | |
|---|---|---|---|
| 4,626,679 A | * 12/1986 | Kuwayama et al. | ... 250/227.11 |
| 4,896,944 A | 1/1990 | Irwin et al. | |
| 5,161,040 A | 11/1992 | Yokoyama et al. | |
| 5,446,565 A | * 8/1995 | Komma et al. | ......... 369/44.23 |
| 5,656,186 A | 8/1997 | Mourou et al. | |
| 6,124,962 A | 9/2000 | Kamikubo | |
| 6,466,359 B2 | 10/2002 | Sunagawa | |
| 6,469,831 B2 | 10/2002 | Iizuka | |
| 6,483,639 B2 | 11/2002 | Fujinoki et al. | |

FOREIGN PATENT DOCUMENTS

| | | | |
|---|---|---|---|
| DE | 19736110 C2 | | 3/1999 |
| EP | 0 679 469 A1 | | 11/1995 |
| JP | 5-135420 | * | 6/1993 |
| JP | A-06-182574 | | 7/1994 |
| JP | 8-78319 | | 3/1996 |
| JP | A-2001-138083 | | 5/2001 |

OTHER PUBLICATIONS

Shoji et al., "Photofabrication of a photonic crystal using interference of UV laser", OSJ/SPIE Conference on Optical Engineering for Sensing and Nanotechnology (ICOSN'99), Yokohama, Japan, Jun. 1999, pp. 541–544.

Momma et al., "Beam delivery of femtosecond laser radiation by diffractive optical elements", Applied Physics A. Materials Science & Processing (Springer–Verlag 1998) A 67 571–520.

English Translation of German Office Action, dated Mar. 7, 2005.

* cited by examiner

Primary Examiner—Jonathan Johnson
(74) Attorney, Agent, or Firm—Oliff & Berridge, PLC

(57) ABSTRACT

In a laser processing apparatus including an ultra-short pulse laser a focusing optical system and processing a work by projecting a beam delivered through the focusing optical system on to the work, the focusing optical system has at least a pair of diffractive surface and a refractive surface, and chromatic aberration is corrected or chromatic aberration and pulse extension are corrected by making use of the diffractive dispersions due to and the diffractive surface the refractive dispersion due to of the refractive surface. With this arrangement, chromatic aberration is corrected or both chromatic aberration and pulse expansion are corrected in the processing with the ultra-short pulse laser and thereby improve the practical use and value of the processing by improving its accuray, qualiy and speed.

20 Claims, 22 Drawing Sheets

ARRAY OF FOCUSED SPOTS

ZEROTH-ORDER    SEVENTH-ORDER

PROCESSED MARK
(ZEROTH-ORDER)

PROCESSED MARK
(SEVENTH-ORDER)

301A REFRACTIVE SURFACE
301B DIFFRACTIVE SURFACE

POSITION IN MICRONS (a)          (b)

(a)

(b)

(a)

(b)

(a)

(b)

LASER PROCESSING METHOD AND LASER PROCESSING APPARATUS

This is a Divisional Application of prior application Ser. No. 10/235,934, filed Sep. 6, 2002 now U.S. Pat. No. 6,642,480.

BACKGROUND OF THE INVENTION

1. Field of the Invention

The present invention relates to a laser processing method using pulse laser, in particular, using a ultra-short pulse laser whose pulses have a temporal width of $10^{-12}$ second or less such as femto second ($10^{-15}$ second) pulses, and to a processing apparatus for performing the processing method.

2. Description of the Related Art

Recently, there is rapidly growing interest in a processing technology making use of a pulse laser, in particular, ultra-short pulse laser having femto second pulses. However, when the ultra-short pulse laser having a wavelength band width is focused using an ordinary refraction single lens, chromatic aberration occurs due to the refractive dispersion of a refraction lens (a property that the refractive index depends on wavelength, thereby a focused spot is extended laterally and longitudinally. The chromatic aberration depends on the wavelength bandwidth of the ultra-short laser pulse and the magnitude of the dispersion of the refraction lens.

Further, the pulse width of the ultra-short pulse laser is extended by the dispersion of the refraction lens. The magnitude of the pulse extension depends on the peak intensity of pulses, in addition to that it depends on the wavelength bandwidth of the pulse and the dispersive characteristics of the lens material.

Accordingly, when the ultra-short pulse laser is applied to processing, it is necessary to make the processing practically usable by correcting chromatic aberration, or by correcting both chromatic aberration and pulse extension in some cases.

Further, as shown in, for example, FIG. 1, there is also known a processing method of branching the pulse beam from a laser generator 1 into a plurality of pulse beams using a diffraction element 2, focusing the plurality of branched pulse beams using a refraction type focusing lens 3 disposed behind the diffraction element 2, and impinging the focused pulse beams on a work 4. The diffraction element 2 is designed such that the phase thereof is distributed to provide the respective branched beams with substantially the same intensity.

Further, the focusing lens 3 has a Fourier transform action and focuses the plurality of branched pulse beams. In general, there is the following relationship between a pulse width $\Delta t$ of a pulse and a wavelength width $\Delta \lambda$ of a pulse.

$$\Delta t \cdot \Delta \lambda \geq C \tag{1}$$

where, C shows constant. It can be found from the expression (1) that a pulse having a shorter pulse width has a larger wavelength bandwidth. Note that for femto second pulses, a 100 femto second pulse has a wavelength band width of up to ±10 nm.

When the wavelength band width of a pulse is shown by $\Delta \lambda$, the positional derivation (chromatic aberration) $\Delta h$ of laser beams branched by the diffraction element 2 can be estimated by the following relation (2).

$$\Delta h = (mf/p)\Delta\lambda \tag{2}$$

where, m shows the order of diffraction, f shows the focal length of a lens, p shows the length of one cycle of the diffraction element 2. Since the pulse beams branched by the diffraction element 2 are extended as described above, the diameter of a hole tobe processed at the position where the branched beam is focused is also extended in the diffraction direction. While the case in which the diffraction element is arranged one-dimensionally is described here, this is also applied to the case in which it is arranged two-dimensionally.

It can be understood from the relation (2) that when the femto second pulse is branched using the diffraction element, it is difficult to focus the pulses branched by the diffraction element into a small spot because a large chromatic aberration occurs due to the large wavelength band width of the femto second pulse. In contrast, in a long pulse, no problem with the above chromatic aberration occurs even if the pulse beam is branched by the diffraction element because the wavelength band width of the pulse is negligible.

When the femto second pulse laser is branched into the plurality of pulse beams using the optical system shown in FIG. 1 and the pulse beams are focused, the focused spots of the higher-order diffractived beams are extended in terms of shape in the diffraction direction as shown in FIG. 2 due to the wavelength band width of the pulse. Therefore, when the array of the focused spots is impinged on the work 4, processed marks due to higher-order beams are deformed in an oval shape different from the shape of processed marks from lower-order beams. Accordingly, it is difficult to perform the processing uniformly at a plurality of positions.

The femto second laser pulse used in the experiment of branching and focusing using the optical system shown in FIG. 1 has a pulse width of 100 fs, a pulse energy of 1 mJ (repetition rate of 1 KHz), a center wavelength of 800 nm, and a half wavelength bandwidth of ±10 nm.

SUMMARY OF THE INVENTION

The objective of the present invention, which was made in view of the above problems, is to provide a laser processing method and a laser processing apparatus capable of performing the processing more precisely by correcting chromatic aberration or correcting both chromatic aberration and pulse extension when the processing is performed with a single beam of the pulse laser or when the processing is performed with a plurality of beams obtained by branching the laser pulse laser.

In view of the above problems, the present invention employs the following methods and arrangements.

(1) In a laser processing method of the present invention for processing a work by focusing a laser pulse and impinging the focused laser pulse on the work, chromatic aberrations pertinent to the laser pulse are corrected by the combination of diffractive and refractive optical elements. According to the method, diffractive-dispersion and refractive-dispersion are caused by the diffractive and refractive optical elements, respectively. These two kinds of dispersion materializes in a counter-opposite manner and the magnitude of the diffractive-dispersion is greater than that of the diffractive-dispersion, so that longitudinal and lateral chromatic aberrations due to the wavelength bandwidth of the pulse laser are canceled and made sufficiently small. Therefore, a focused spot becomes smaller to thereby improve processing accuracy.

(2) Further, chromatic aberrations and pulse extension pertinent to the laser pulse are corrected by the combination of diffractive and refractive optical elements. According to the method, diffractive-dispersion and refractive-dispersion are caused by the diffractive and refractive optical elements, respectively. These two kinds of dispersion matelaizes in a counter opposite manner and the magnitude of the diffractive-dispersion is greater than that of the refractive-dispersion, so that chromatic aberrations and pulse expansion due to the wavelength bandwidth of the laser pulse are suppressed to a sufficiently low level. Therefore, a focused spot becomes smaller to thereby improve processing accuracy.

(3) In a laser processing apparatus of the present invention having a pulse laser focusing optical system, for performing the processing by impinging a beam delivered from the focusing optical system on a work, the focusing optical system includes at least a pair of a diffractive surface and a refractive surface. According to the apparatus, the pair of the diffractive surface and the refractive surface functions to cause the effects explained in the items (1) and (2), thereby the processing can be performed with a pinpoint accuracy.

(4) The focusing optical system may be composed of a refraction lens having a diffractive surface.

(5) Further, the focusing optical system may be composed of a sheet having a refractive surface and a refraction lens.

(6) Another method of the present invention includes the steps of branching a laser pulse into a plurality of beams by a branching diffraction element, correcting a chromatic aberrations caused to the plurality of branched beams through a focusing optical system, and focusing and impinging the plurality of branched beams whose chromatic aberrations have been corrected, on a work. According to the method, the distortion in shape of the array of focused spots obtained by focusing the array of pulse beams branched by diffraction element, which is caused by chromatic aberrations, can be prevented.

(7) A focusing diffraction element having a focusing action may be used as the focusing optical system, and the distance between the branching diffraction element and the focusing diffraction element may be set approximately equal to the focusing length of the focusing optical system. According to the arrangement, the lateral aberration caused on the array of beams branched by the branching diffraction element is removed, thereby the shapes and sizes of the array of focused spots formed from the array of pulse beams branched by the branching diffraction element can be made approximately the same. Therefore, a plurality of processed works having approximately the same shape and size can be obtained on a work.

(8) Further, an optical system composed of at least two groups each having refracting and diffracting actions may be used as the focusing optical system, and the position of the principal plane of the optical system may be best adjusted according to the wavelength band of the pulse laser. According to the arrangement, lateral and longitudinal aberrations caused on the array of beams branched by the branching diffraction element are removed, thereby the shapes and sizes of the array of focused spots formed from the array of pulse beams branched by the branching diffraction element can be made approximately the same. Therefore, a plurality of processed marks having approximately the same shape and size can be obtained on a work.

(9) Another apparatus of the present invention includes a laser generator for generating laser pulses a branching diffraction element for branching the laser pulse generated by the laser generator into an array of beams, and a focusing optical system for focusing the array of laser beams branched by the branching diffraction element after correcting chromatic aberrations on the branched beams. The effect explained in the item (6) can be achieved by the apparatus.

(10) A focusing diffraction element having a focusing action may be provided as the focusing optical system, and the distance between the branching diffraction element and the focusing diffraction element may be set approximately equal to the focusing length of the focusing optical system. The effect explained in the item (7) can be achieved by the apparatus.

(11) An optical system composed of at least two groups each having refracting and diffracting actions may be disposed as the focusing optical system. The effect explained in the item (8) can be achieved by the apparatus.

(12) Note that a refraction lens having at least one diffractive surface may be provided as a group of the optical system having the refracting and diffracting actions.

(13) At least one diffractive surface and a refraction lens formed in a member different from a member to which the diffractive surface is formed may be provided as a group of the optical system having the refracting and diffracting operations.

(14) The optical system composed of the two groups may be composed of a first group and a second group, the diffractive surface of the first group may have negative power, the refraction lens of the first group may have positive power, the refraction lens of the second group may have negative power, and the diffractive surface of the second group may have positive power, respectively.

(15) Another method of the present invention may shape the spatial intensity distribution of the pulse laser to a predetermined shape by a diffraction element. According to the method, laser pulses suitable for the processing can be simply obtained by replacing the diffraction element.

(16) Another apparatus of the present invention may include a diffractive pulse shaper for shaping the spatial intensity distribution of the pulse laser to a predetermined shape. The effect explained in the item (15) can be achieved by the apparatus.

(17) Further, a phase function for shaping the spatial intensity distribution of the pulse laser beam to the predetermined shape may be multiplexed to a phase distribution for branching the pulse laser beam. According to the arrangement, laser pulses can be branched and shaped by a single diffraction element, which contributes to the reduction in the size and cost of the apparatus.

(18) Another method of the present invention includes the steps of diffracting a pulse laser beam by a diffraction element, correcting chromatic aberrations caused on the pulse laser beam through a focusing optical system, and moving the focusing position of the pulse laser beam by rotating the diffraction element. According to the method, processing can be performed with a pinpoint accuracy by the diffraction element and the determination of processing position by rotation of the diffraction element, in addition to the correction of chromatic aberrations.

(19) Note that the pulse laser beam may be branched into a plurality of beams, and the plurality of branched beams may be focused and arrayed in a pattern. According to the arrangement, processing speed and a processing yield can be improved.

(20) A focusing diffraction element having a focusing action may be used as the focusing optical system, and the distance between the branching diffraction element and the focusing diffraction element may be set approximately equal to the focusing length of the focusing diffraction element. According to the arrangement, lateral chromatic aberration caused on the plurality of beams branched by the branching diffraction element is removed, thereby the shapes and sizes of the array of focused spots formed from the plurality of pulse beams branched by the branching diffraction element can be made approximately the same.

(21) Further, an optical system composed of at least two groups each having refracting and diffracting actions may be used as the focusing optical system, and the position of the principal plane of the optical system may be best adjusted according to the wavelength band width of the pulse laser. According to the arrangement, lateral and longitudinal chromatic aberrations caused on the plurality of beams branched by the branching diffraction element are removed, thereby the shapes and sizes of the array of focused spots formed from the plurality of pulse beams branched by the branching diffraction element can be made approximately the same.

(22) Another apparatus of the present invention includes a laser generator for generating a pulse laser beam, a diffraction element for diffracting the pulse laser generated by the pulse generator, a focusing optical system for correcting chromatic aberrations aberration due to the wavelength bandwidth of the pulse laser caused on the diffracted pulse beam by the diffraction element and focusing the diffracted pulse laser beam whose chromatic aberrations have been corrected, and a rotation unit for rotating the diffraction element. The effect explained in the item (18) can be achieved by the apparatus.

(23) Note that the rotation unit may rotate and move the focused spot of the laser beam diffracted by the diffraction element.

(24) A branching diffraction element for branching the pulse laser beam generated by the laser generator into a plurality of beams may be provided, and the branching diffraction element may produce a plurality of branched beams. According to the arrangement, a plurality of focused spots are provided, thereby processing speed can be increased.

(25) Note that the optical axis of the laser beam incident on the diffraction element may be set to agree with the center of rotation of the diffraction element.

(26) Further, the optical axis of the laser beam incident on the diffraction element may be off-set from the center of rotation of the diffraction element.

(27) A focusing diffraction element having a focusing action may be provided as the focusing optical system, and the distance between the diffraction element and the focusing diffraction element may be set approximately equal to the focusing length of the focusing diffraction element. The effect explained in the item (20) can be achieved by the apparatus.

(28) An optical system composed of at least two groups each having refracting and diffracting actions may be disposed as the focusing optical system. The effect explained in the item (21) can be achieved by the apparatus.

(29) Note that a refraction lens having at least one diffractive surface may be provided as a group of the optical system having the refracting and diffracting actions.

(30) Further, at least one diffractive surface and a refraction lens formed in a member different from another member to which the diffractive surface is formed may be provided as a group of the optical system having the refracting and diffracting operations.

DESCRIPTION OF THE PREFERRED EMBODIMENTS

Embodiment 1 (Processing Performed by a Single Beam)

Figure 1:
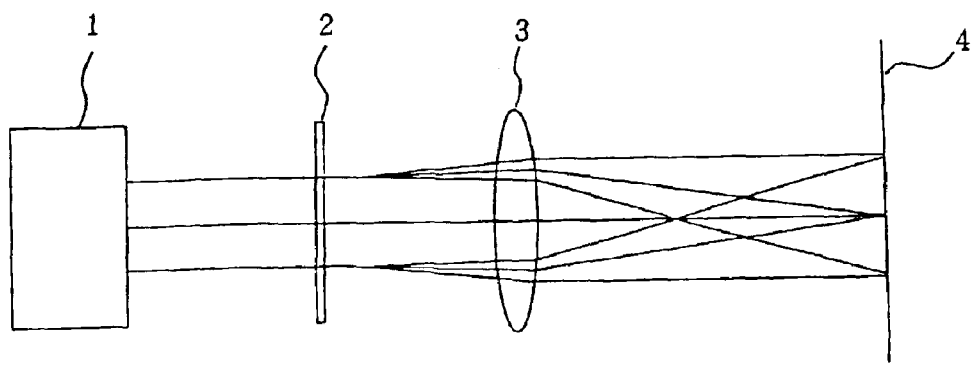
FIG. 1 is a view showing an arrangement of a conventional laser processing apparatus.
Figure 2:
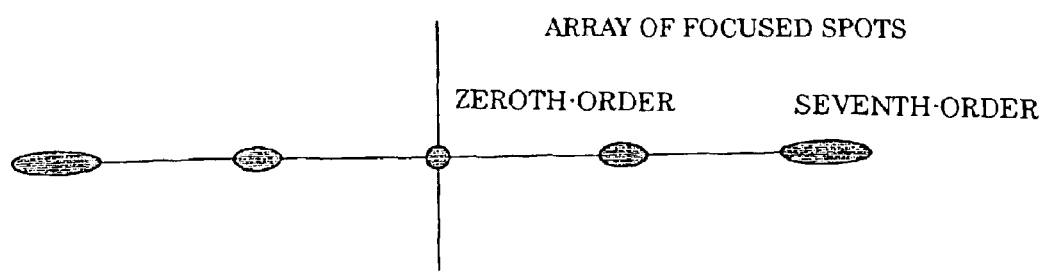
FIG. 2 is a view explaining the array of focused spots formed by the conventional laser processing apparatus.
Figure 3:
FIG. 3 is a view comparing processed traces formed by the conventional laser processing apparatus with each other.
Figure 3:
Figure 4:
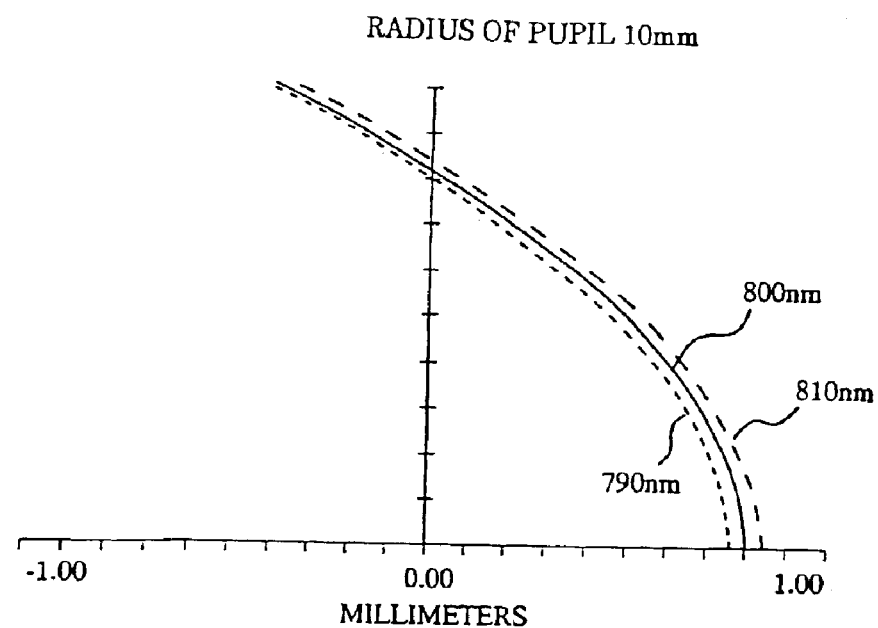
FIG. 4 is a graph showing longitudinal aberration characteristics of a refraction single lens.
Figure 5:
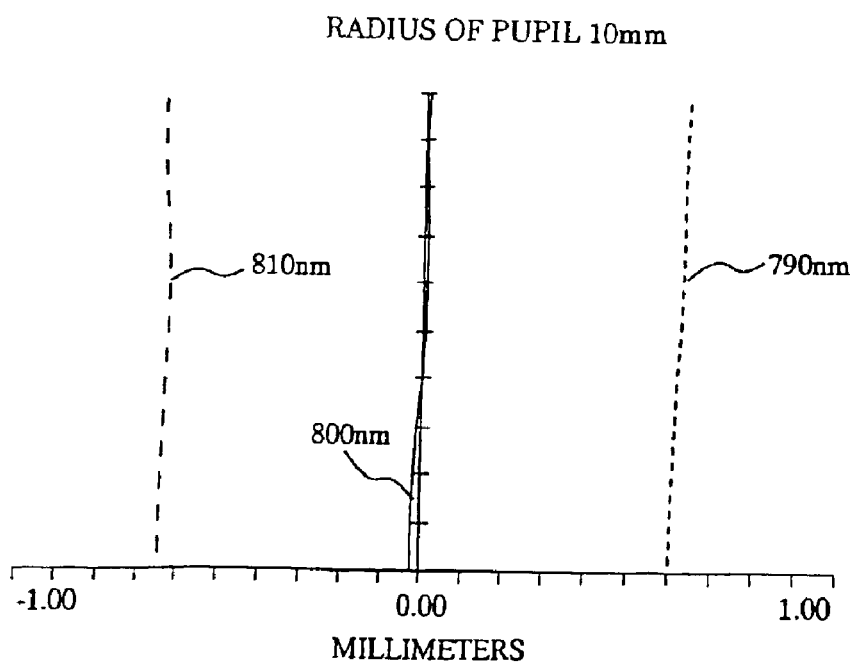
FIG. 5 is a graph showing longitudinal aberration characteristics of a diffraction single lens.

When an ultra-short pulse laser is applied to processing, it is required to correct chromatic aberration or to correct chromatic aberration and pulse extension in some cases, in addition to the correction of ordinary mono-chromatic aberrations. For this purpose, a focusing optical system in which a diffractive surface and a refractive surface are combined is effective. This is because of two reasons that (1) the diffractive-dispersion caused by diffractive surface occurs in a opposite sense to the refractive-dispersion refraction-diffusion caused by refractive surface, and (2) the magnitude of diffractive-dispersion is in one order greater than that of the refractive-dispersion. For reference, FIGS. 4 and 5 show aberration characteristics of a refraction single lens and those of a diffraction single lens, respectively.

A focusing optical system composed of one diffractive surface and one refraction lens is considered here. It is assumed that the diffractive surface is disposed on or in contact with the refraction lens. This focusing optical system has a resultant focusing length f determined by the following relation (3).

$$1/f = 1/fd + 1/fr \quad (3)$$

where, fd shows a focusing length of a diffractive surface, and fr shows a focusing length of a refraction lens.

To suppress chromatic aberration and pulse extension of the pulse laser, it is necessary for different wavelengths to focus into a single point. For this purpose, the following relation (4) must be satisfied.

$$0 = (1/fd)(1/\nu d) + (1/fr)(1/\nu r) \quad (4)$$

where, $\nu d$ shows the inverse dispersion of a diffractive surface and $\nu r$ shows the inverse dispersion of a refraction lens, and they are defined as shown by the following formulas (5-1) and (5-2).

$$1/\nu d = -(\Delta\lambda/\lambda) \quad (5\text{-}1)$$

$$1/\nu r = -(\Delta n/(n-1)) \quad (5\text{-}2)$$

where, $\Delta\lambda$ shows a change of a wavelength $\lambda$, and $\Delta n$ shows a change of a refractive index n. The values of fd and fr are determined from the relations (3) and (4) as shown in the following formulas.

$$fd = f(\nu d - \nu r)/\nu d \quad (6\text{-}1)$$

$$fr = f(\nu r - \nu d)/\nu r \quad (6\text{-}2)$$

From the properties of diffractive-dispersion and refractive-dispersion, $\nu d<0$, $\nu r>0$, and further $|\nu d|<<|\nu r|$ are obtained. Further, $fd>0$ and $fr>0$ are obtained because $f>0$. Accordingly, the power of the refraction lens is reduced by distributing some power to the diffractive surface, thereby the thickness of the refraction lens is reduced. This is also advantageous to suppress the pulse extension.

In an actual design, mono chromatic aberrations as well as chromatic aberration are taken into consideration. For this purpose, various coefficients for defining the phase function of the diffractive surface and the shape of the refractive surface are strictly determined by ray-tracing. Further, pule extension is added as an evaluation item in design, in addition to the aberration characteristics. Since the magnitude of the pulse extension is proportional to the thickness of the lens, the diffractive surface and the refractive surface are designed so as to compensate for the pulse extension. Further, the pulse has an in-plane spatial intensity distribution (for example, Gaussian distribution), an unnecessary beam wave front aberration occurs through a non-linear interaction between the beam and the medium that the beam travels through. To cope with this problem, the diffractive surface and the refractive surface are designed also in consideration of the unnecessary beam wave front aberration.

Two examples (examples of design) are shown below. Note that the examples also show aberration characteristics of a pair of lenses (doublet) used ordinarily as compared with aberration characteristics of focusing elements.

EXAMPLE 1

Figure 6:
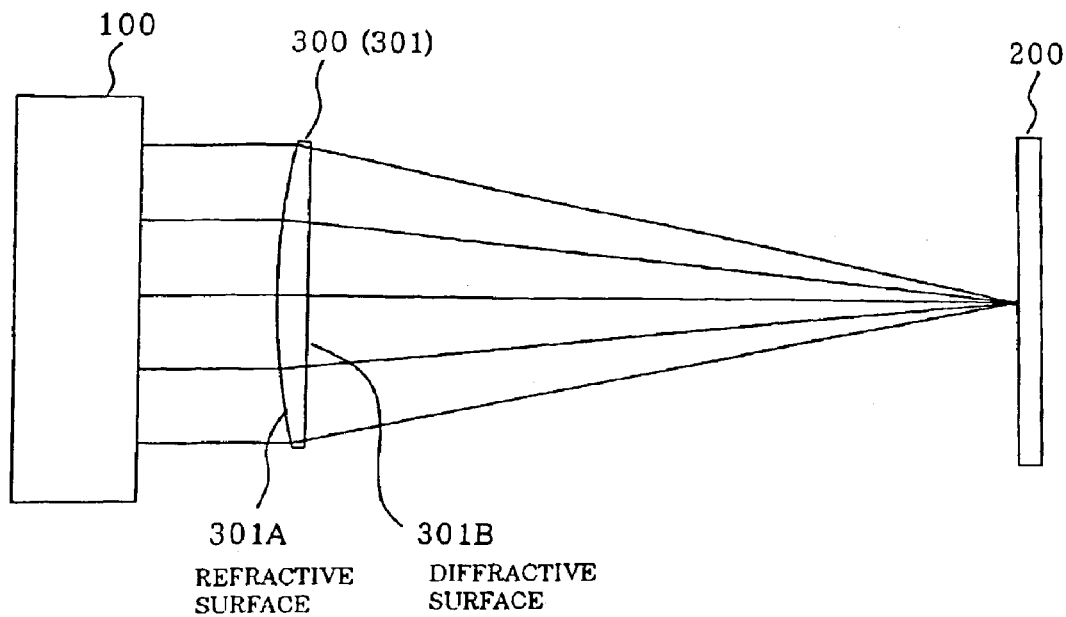
FIG. 6 is a view showing a schematic arrangement of a laser processing apparatus of an example 1.

FIG. 6 is a view showing a schematic arrangement of a laser processing apparatus according to an example 1 of the present invention. This apparatus includes a laser generator 100 for generating a laser beam, a focusing optical system 300 for focusing the laser beam generated in the laser generator 100, and performs materials processing by irradiating a work 200 with the laser beam focused by the focusing optical system 300. The focusing optical system 300 is composed of a refraction lens 301 having a diffractive surface. A first surface 301A of the lens 301 is arranged as a refractive surface, and a second surface 301B thereof is arranged as a diffractive surface. The lens 301 has the following surface data. The first surface 301A has a radius of curvature (2.36E−02) and the second surface 301B has a radius of curvature (0.00E+00). Further, a phase function $\Phi(r)$ for defining the diffraction surface of the second surface 301B will be examined. The phase function $\Phi(r)$ is given by the following equation (7).

$$\Phi(r) = \Sigma An \cdot r^{2n} \quad (7)$$

In this polynomial, $\Sigma$ shows summation, An shows the coefficients of respective terms, and r shows the position in radial direction. Further, r takes a value between (0 and 1) nomalized by a maximum radius, and n is a natural number of 1 and over. In the example 1, the respective coefficients of the phase function $\Phi(r)$ that defines the diffractive surface of the second surface 301B include a second-order coefficient A1 (−5.882016), a fourth-order coefficient A2 (0.009745), a sixth-order coefficient A3 (2.144441E−6), and an eighth-order coefficient A4 (4.673371E−10).

Figure 7:
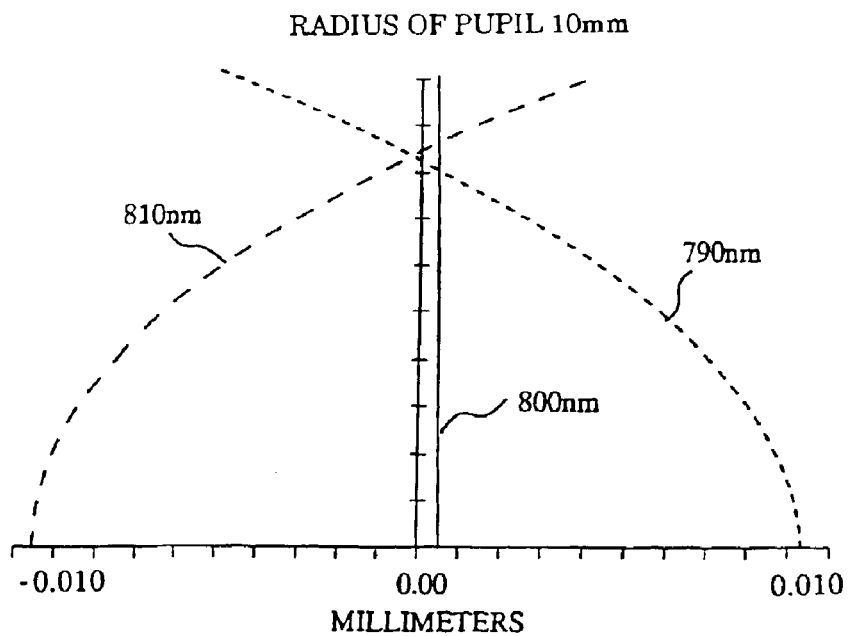
FIG. 7 is a graph showing longitudinal aberration characteristics of a focusing optical system of the example 1.
Figure 8:
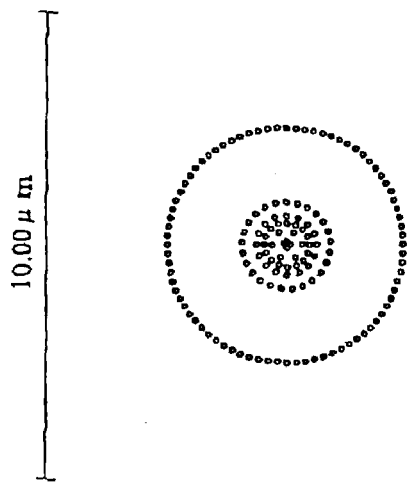
FIG. 8 is a spot diagram showing a position where laser beams are focused by the focusing optical system of the example 1.

FIG. 7 is a graph showing longitudinal aberration characteristics of the focusing optical system 300, and FIG. 8 is a spot diagram showing where laser beams are focused by the focusing optical system 300. It can be found from FIGS. 7 and 8 that longitudinal and lateral aberrations have been reduced to a practically acceptable level by using the focusing optical system 300 in which the diffractive surface is combined with the refractive surface. Further, since signs longitudinal aberration occurs in opposite signs with respect to the wavelengths (here, 790 nm and 810 nm) at the both ends of a pulse sepctral bandwidth, the pulse extension due to the refractive-dispersion can be also sufficiently suppressed.

EXAMPLE 2

Figure 9:
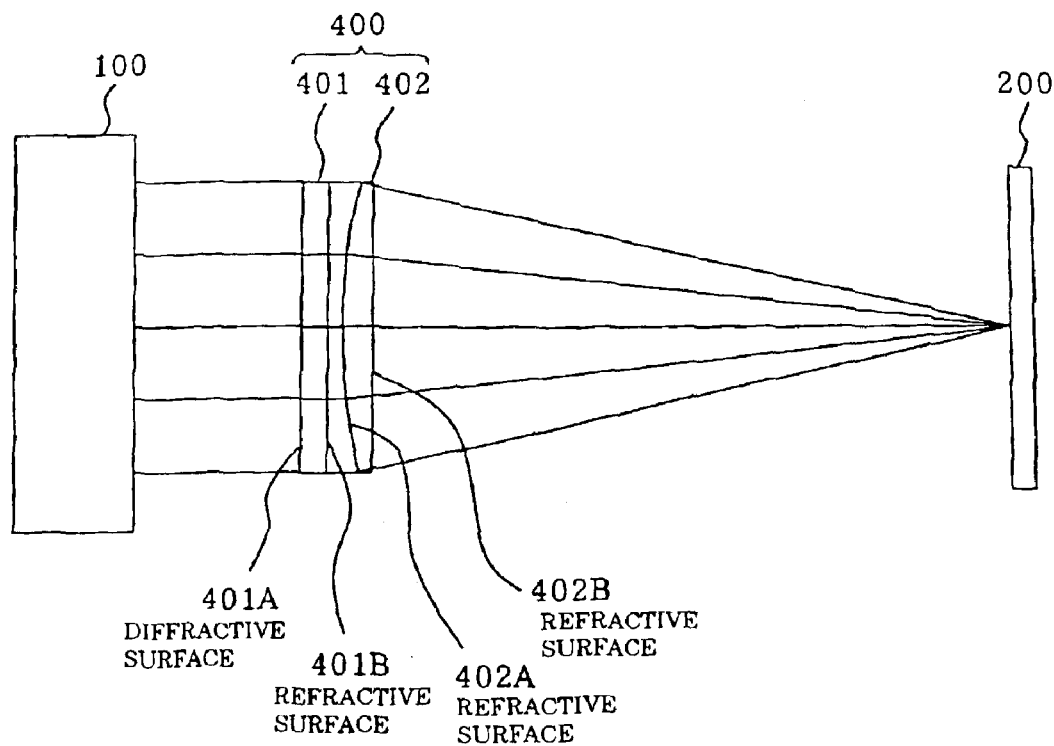
FIG. 9 is a view showing a schematic arrangement of a laser processing apparatus of an example 2.

FIG. 9 is a view showing a schematic arrangement of a laser processing apparatus according to an example 2 of the present invention, wherein a focusing optical system of the second example is different from that of the first example. In the arrangement shown in FIG. 9, a focusing optical system 400 is composed of a sheet 401 having a refractive surface and a refraction lens 402, and the sheet 401 is separated from the refraction lens 402. A first surface 401A of the sheet 401 is arranged as a diffractive surface, and a second surface 401B of the sheet 401 and third and fourth surfaces 402A and 402B of the refraction lens 402 are arranged as refractive surfaces. Further, these surfaces have the following data. The first surface 401A has a radius of curvature (0.00E+00), the second surface 401B has a radius of curvature (0.00E+00), the third surface 402A has a radius of curvature (2.64E−02), and the fourth surface 402B has a radius of curvature (2.68E−03).

Further, the respective coefficients of the phase function $\Phi(r)$ that defines the diffractive surface of the first surface 401A include a second-order coefficient (−5.595371), a fourth-order coefficient (0.007109), a sixth-order coefficient (−2.364591E−6), and an eighth-order coefficient (−2.10204E−9).

Figure 10:
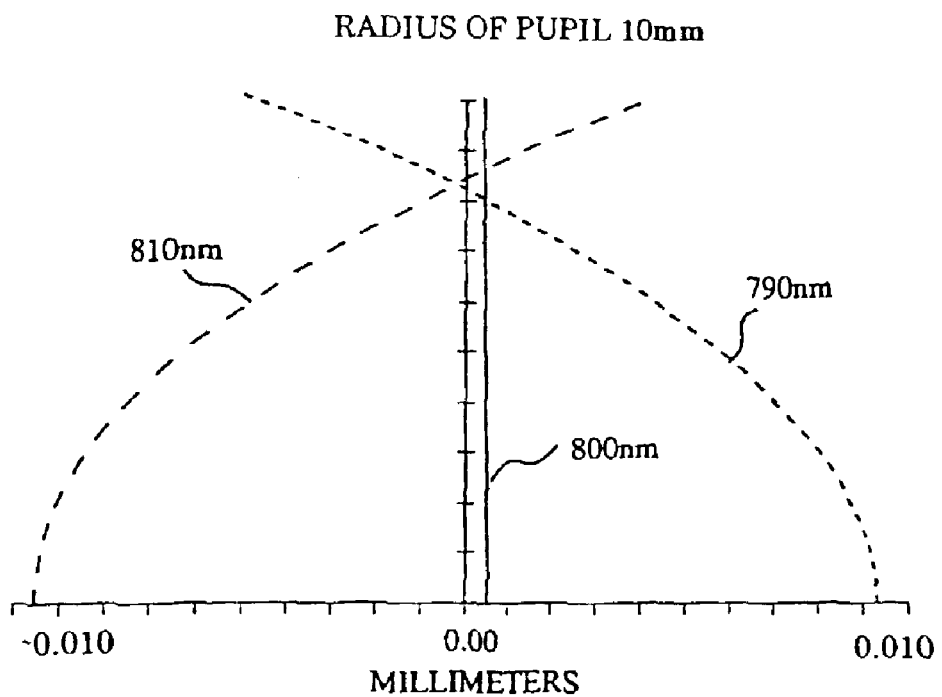
FIG. 10 is a graph showing longitudinal aberration characteristics of a focusing optical system of the example 2.
Figure 11:
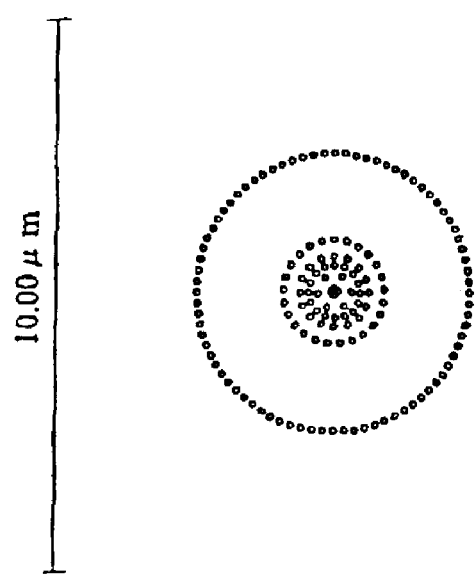
FIG. 11 is a spot diagram showing a position where laser beams are focused by the focusing optical system of the example 2.

FIG. 10 is a graph showing longitudinal aberration characteristics of the focusing optical system 400, and FIG. 11 is a spot diagram obtained with the focusing optical system 400. It can be found from FIGS. 10 and 11 that longitudinal and lateral aberrations have been reduced to a practically ecceptable level by using the focusing optical system 400 in which the diffractive surface is combined with the refractive surface. Further, since a longitudinal aberration occurs in opposite signs with respect to the wavelengths (here, 790 nm and 810 nm) at the both ends of a pulse spectral bandwidth, the pulse extension due to the refractive dispersion can be also sufficiently suppressed.

Note that, in the examples 1 and 2, it is also possible to arrange the base surface of the diffractive surface and/or the refractive surface as aspherical surfaces. Further, it is also possible to swap the position of the diffractive surface with that of the refractive surface.

Figure 12:
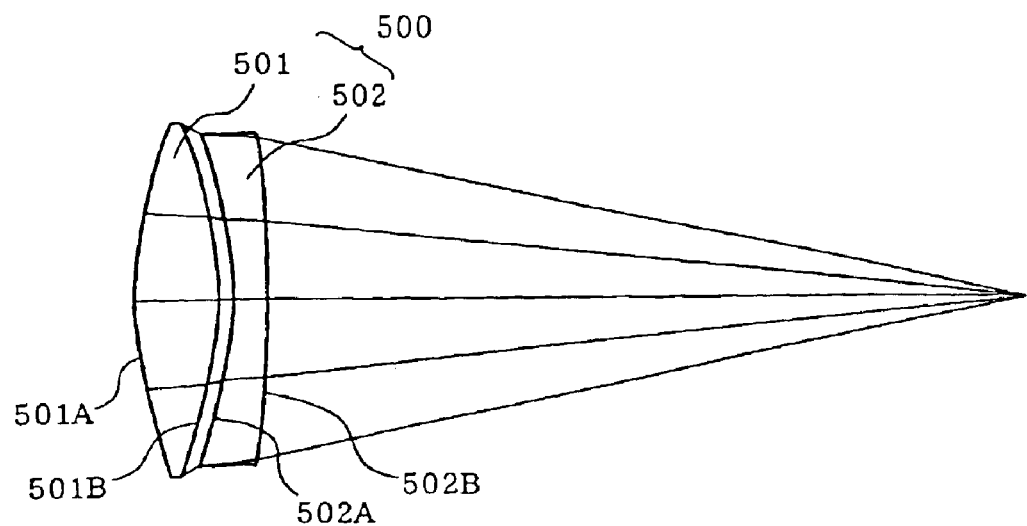
FIG. 12 is a view showing an arrangement of a focusing optical system of the conventional laser processing apparatus.
Figure 13:
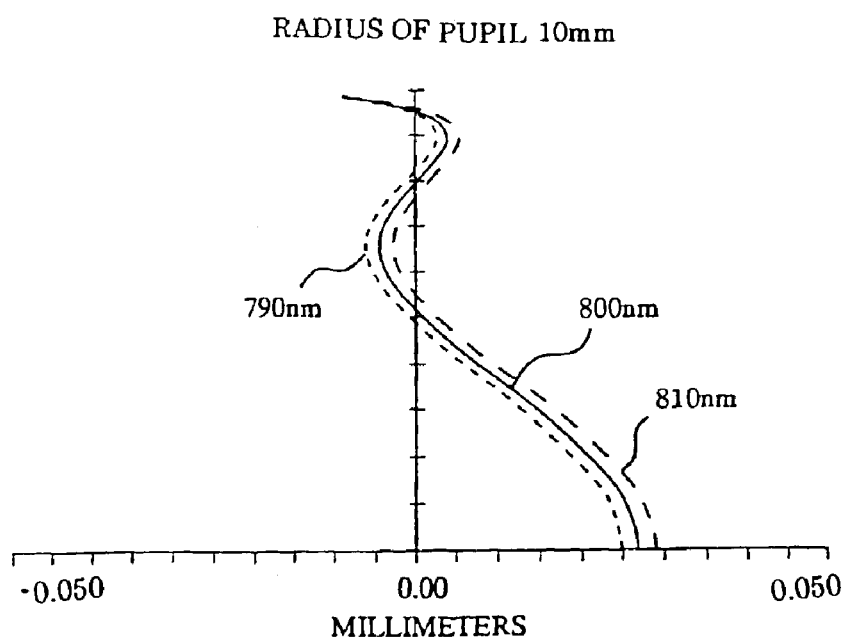
FIG. 13 is a graph showing longitudinal aberration characteristics of the focusing optical system shown in FIG. 12.
Figure 14:
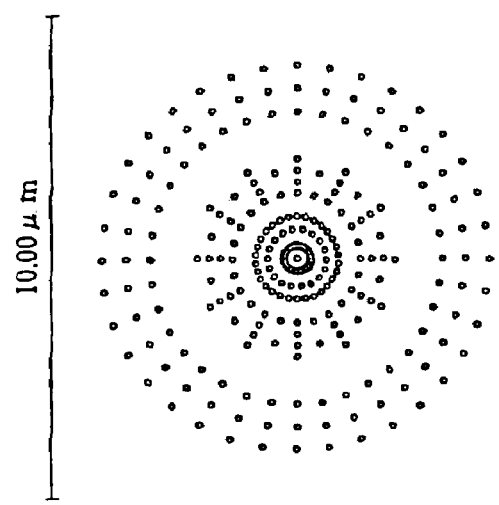
FIG. 14 is a spot diagram showing a position where laser beams are focused by the condensing optical system shown in FIG. 12.

FIG. 12 shows an arrangement of a focusing optical system 500 composed of a pair of conventional lenses, FIG. 13 shows aberration characteristics of the focusing optical system 500, and FIG. 14 shows a spot diagram thereof, respectively for the comparison of the focusing optical system 500 with those of the above examples 1 and 2. In this arrangement, a first surface 501A and a second surface 501B together from a convex lens 501, and a third surface 502A and a fourth surface 502B together from a concave lens 502. All the surfaces are spherical. The first surface 501A has a radius of curvature (3.90E−02), the second surface 501B has a radius of curvature (−3.58E−02), the third surface 502A has a radius of curvature (−3.89E−02), and the fourth surface 502B has a radius of curvature (−1.50E−02). When the focusing optical system 500 is compared with those of the examples 1 and 2, longitudinal aberration is not corrected sufficiently, and the spot diagram thereof is about twice as large as those of the examples 1 and 2. Further, since the longitudinal aberration occurs in the same sign with respect to different wavelengths, the pulse extension due to refractive dispersion fails to be sufficiently corrected.

Embodiment 2 (Processing Making Use of a Plurality of Branched Beams)

EXAMPLE 3

Figure 15:
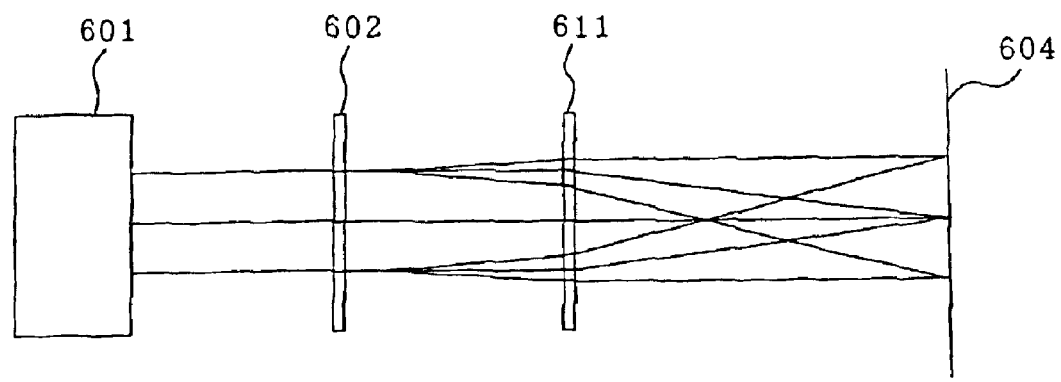
FIG. 15 is a view showing a schematic arrangement of a laser processing apparatus of an example 3.

FIG. 15 is a view showing an arrangement of a laser processing apparatus according to an example 3 of the present invention. As shown in FIG. 15, this laser processing apparatus is composed of a laser generator 601 for generating femto second laser pulses, a branching diffraction element 602 for branching the pulse beam from the laser generator 601 into a plurality of pulse laser beams, and a focusing diffraction element 611 for focusing the plurality of pulse laser beams branched by the branching diffraction element 602. In this case, a lateral aberration can be removed by appropriately positioning these two diffraction elements 602 and 611.

A position of an m-th-order focusing spot impinging on a surface to be processed is theoretically determined by the following equation (8).

$$y=[s(1-L/f)-L]u \qquad (8)$$

where, s shows the distance from the branching diffraction element 602 to the focusing diffraction element 611, and L shows the distance from the focusing diffraction element 611 to a surface to be processed of a work 604. Further, f shows the focusing length of the focusing diffraction element 611, and u shows the diffraction angle that is given by $u=m\lambda/p$. Here, m shows the order of diffraction, $\lambda$ shows the pulse wavelength, and p shows the length of one cycle of the branching diffraction element 602.

A derivation $\Delta y$ of the focus position of the pulse beam, which is branched by the branching diffraction element 602, with respect to a change $\Delta u$ of the diffraction angle (caused by a change of a wavelength) can be determined by differentiating the equation (8) as below in (9).

$$\Delta y=[s(1-2L/f)-L]\Delta u \qquad (9)$$

Note that, to derive the equation (9), the relationship $\Delta u/u = \Delta\lambda/\lambda$ that goes with the branching diffraction element 602 and the relationship $\Delta\lambda/\lambda = -\Delta f/f$ that is holds true for the focusing diffraction element 611 are used. Further, when the focusing diffraction element 611 is realized as a Fresnel lens that is consists of only a second-order term having a radius r and high-order aberration components thereof are ignored, the aberration function of the Fresnel lens is determined by the following equation (10).

$$\phi(r)=-\pi r^2/(\lambda f) \qquad (10)$$

Accordingly, when it is assumed, for example, that $\lambda=800$ nm and f=100 mm, $\phi(r)=-39.27r^2$.

When it is assumed that the focal plane of the plurality of branched pulse beams coincides with the surface to be proceed of the work 604, the following equation (11) is derived by putting L=f in the equation (9).

$$\Delta y=-(s+f)\Delta u \qquad (11)$$

From the above relationship, if s=−f, then Δy=0 regardless of the change Δu of the diffraction angle. That is, if the distance from the branching diffraction element 602 to the focusing diffraction element 611 is set equal to the focusing length from the focusing diffraction element 611 to the surface to be processed, lateral aberration caused on the plurality of branched beams can be corrected.

Figure 16:
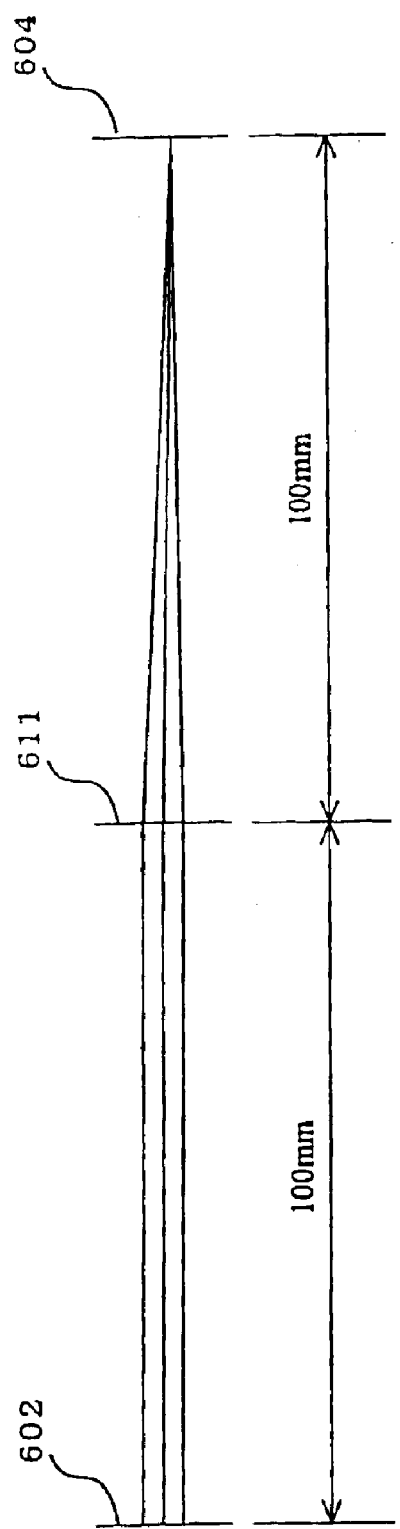
FIG. 16 is a view showing an optical layout of the laser processing apparatus of the example 3.
Figure 17:
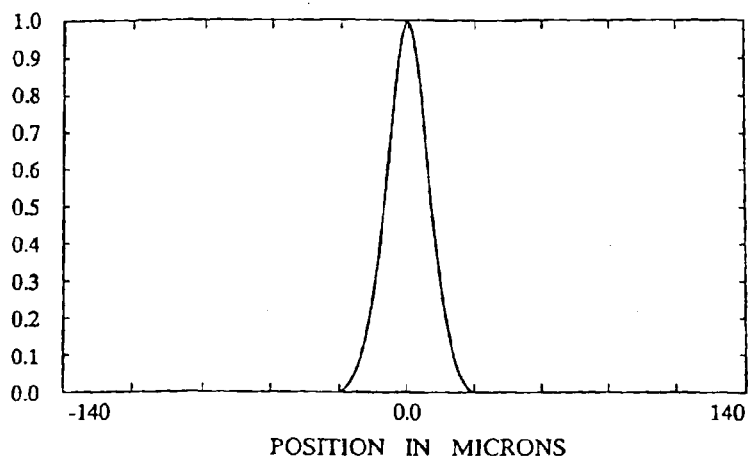
FIG. 17 is a graph showing a point image formed by the optical layout of the example 3.

An optical layout of the example 3 based on the above theory is as shown in FIG. 16. Then, the point image formed by the optical layout is as shown in the graph of FIG. 17.

Figure 18:
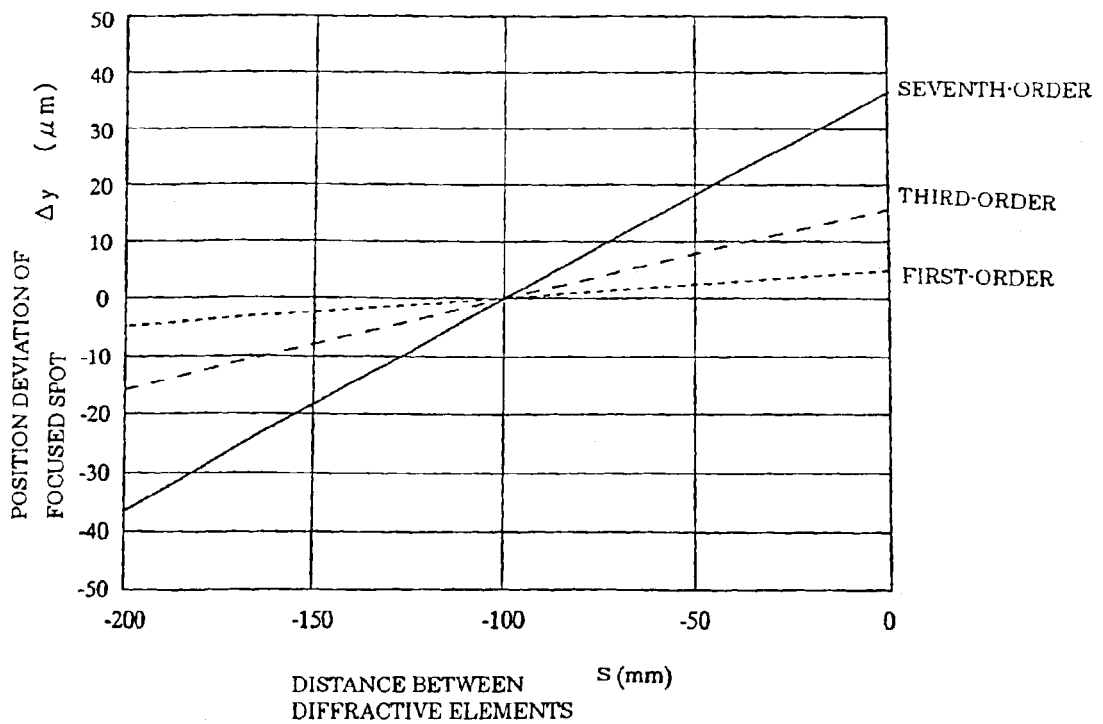
FIG. 18 is a graph showing a relationship between a distance between the diffraction gratings and a positional deviation of a focused spot position in the laser processing apparatus of the example 3.

In the laser processing apparatus, even if the condition S=−f is somewhat varied, no problem emerges as long as it is within a tolerance. How strictly the positional alignment must be made may be determined from a necessary size of a region to be processed and a required uniformity of the process in the region. Note that when the focusing length f of the focusing diffraction element 611 is fixed to 100 mm in the optical layout shown in FIG. 16, the positional dirivation Δy of a focused spot from one of the plurality of pulse beams (first-, third- and seventh-order pulse beams are exemplified) by the optical system as a function of the distance between the two diffraction elements 602 and 611 is plotted as shown in FIG. 18.

The femto second laser and the data of the respective diffraction elements used in the laser processing apparatus of the example 3 are as shown below. Note that they show only an example.

i) Femto second laser: it has a pulse width of 100 fs, a pulse energy of 1 mJ (repetition rate of 1 KHz), a center wavelength of 800 nm, a half wavelength bandwidth of ±10 nm, and a pulse beam diameter of 6 mm;

ii) Branching diffraction element 602: it has 21 branches and the branch intervals of 200 μm, and the 21 pulse beams branched by the element are arranged to have substantially the same intensity; and iii) Focusing diffraction element 611: it has a focusing length of 100 mm.

The diffraction elements 602 and 611 are formed on a substrate composed of high quality fused silica, and the like by, for example, laser drawing and ion etching.

Figure 19:
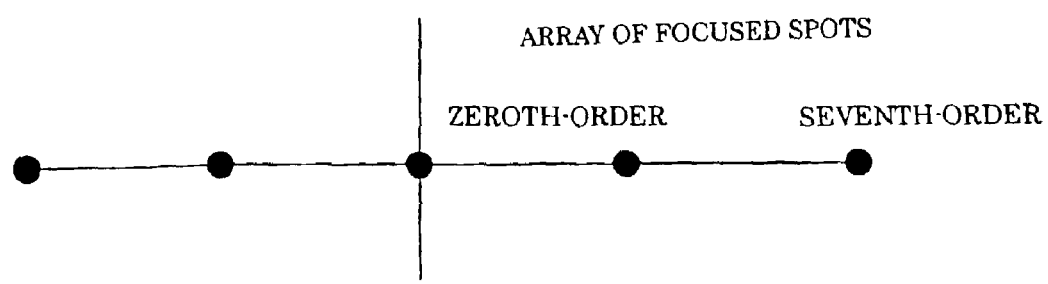
FIG. 19 is a view explaining the array of focused spots formed by the laser processing apparatus of the example 3.

When the femto second laser beam is branched and focused using the processing apparatus of the example 3, the lateral aberration is corrected with the optimum element distance (s=−f) described above, and the focused spots formed by the optical system have substantially the same shape and size regardless of the order of diffraction, as shown in, for example, FIG. 19. Accordingly, when an array of the uniformly branched, focused spots is projected on the work 604, processed traces having the same shape and size can be obtained on the work 604.

The processing apparatus of the example 3 further has the following advantages:

i) since there are provided a small number of elements that are light in weight, the system can be adjusted and handled easily; and ii) since the diffraction optical element is formed in a sheet having a thickness of about 1 mm, an optical-path distance in a member through which pulses pass is short enough to minimize unnecessary wave front aberrations caused by the spatial intensity distribution of the pulses. As a result laser beam spots having a well-focused shape are obtained which is important when the femto second pulse laser is applied to micro-processing.

EXAMPLE 4

Figure 20:
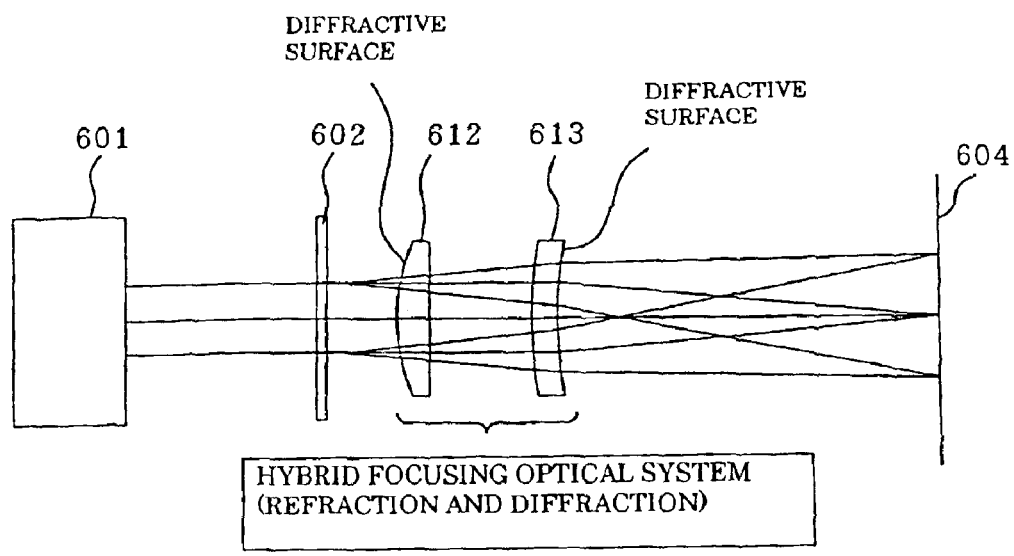
FIG. 20 is a view showing a schematic arrangement of a laser processing apparatus of an example 4.

FIG. 20 is a view showing an arrangement of a laser processing apparatus of an example 4 of the present invention. The apparatus is composed of a laser generator 601 for generating femto second laser pulses laser, a branching diffraction element 602 for branching the pulse laser beam from the laser generator 601 into a plurality of pulse laser beams, and a hybrid focusing optical system composed of first and second refraction lenses 612 and 613 each having a diffractive surface. The first refraction lens 612 with the diffractive surface is composed of a convex/concave spherical lens (positive power) and has the diffractive surface (negative power) formed on the incident side surface thereof. The second refraction lens 613 with the diffractive surface is composed of a concave/convex spherical lens (negative power) and has the diffractive surface (positive power) formed on the outgoing side surface thereof.

When the pulse beam emitted from the laser generator 601 is branched by the branching diffraction element 602, a longer wavelength has a larger diffraction angle, thereby a pulse component having a longer wavelength travels farther outward. To mark up for this wavelength-dependent characteristics, it is necessary to provide the focusing optical system with a large lateral chromatic aberration Δβ. That is, the angular magnification of the system needs to be arranged, according to the following relationship, $$\lambda f = \text{constant} \tag{12}$$

Here, λ is the wavelength and f is the focusing distance. A diffraction angle u is greatly changed by a slight amount of the change Δλ of wavelength. Therefore, it is necessary to set a difference Δf of the focusing length for a wavelength difference 30 that it can correct lateral chromatic aberration caused due to the branching diffraction element by using a diffractive surface having a large amount of dispersive power. At the same time, laser beams must be focused at the same position regardless of wavelength. As described above, since a considerably large amount of dispersive power must be produced by the focusing optical system, an arrangement composed of only refraction lens would require a large number of surfaces. To overcome this problem, each of the refraction lenses involred should be provided with the diffractive surface.

A focusing length f of this focusing optical system in its effect is determined by the following relation (13).

$$1/f = 1/f1 + 1/f2 - d/(f1\ f2) \tag{13}$$

where, f1 and f2 show the focusing length of the first and second refraction lenses 612 and 613 with the diffractive surfaces and are determined by the following equations (14-1) and (14-2).

$$1/f1 = 1/f1r + 1/f1d \tag{14-1}$$

$$1/f2 = 1/f2r + 1/f2d \tag{14-2}$$

where, f1r and f1d show the focusing length of the refraction lens and the focusing length of the diffractive surface of the first refraction lens 612 with the diffractive surface, whereas f2r and f2d show the focusing length of the refraction lens and the focusing length of the diffractive surface of the second refraction lens 613 with the diffractive surface. The focusing-length differences Δf1 and Δf2 of the condensing distances of these lenses due to the wavelength difference Δλ are determined by the following equations (15-1) and (15-2).

$$\Delta f1 = f1^2[(-\Delta n/(n-1))/fr1 + (-\Delta \lambda/\lambda)/fd1] \tag{15-1}$$

$$\Delta f2 = f2^2[(-\Delta n/(n-1))/fr2 + (-\Delta \lambda/\lambda)/fd2] \tag{15-2}$$

Note that the overall Δf is determined from Δf1 and Δf2 described above. Then, Δf1 and Δf2 are determined from the design of the refraction lenses and the diffractive surfaces formed thereon.

Decreasing in the distance d between the first refraction lens 612 with the diffractive surface and the second refraction lens 613 with the diffractive surface requires a large dispersive power, resultiy in a large focusing power of the two lenses. Increasing the distance d enables to reduce the dispersive power of the lenses and, thereby to reduce the focusing power of the lenses. Accordingly, it is desirable to set distance d as large as practically possible so that the feature size of the diffractive surfaces can become coarse enough to be produced easily.

Figure 21:
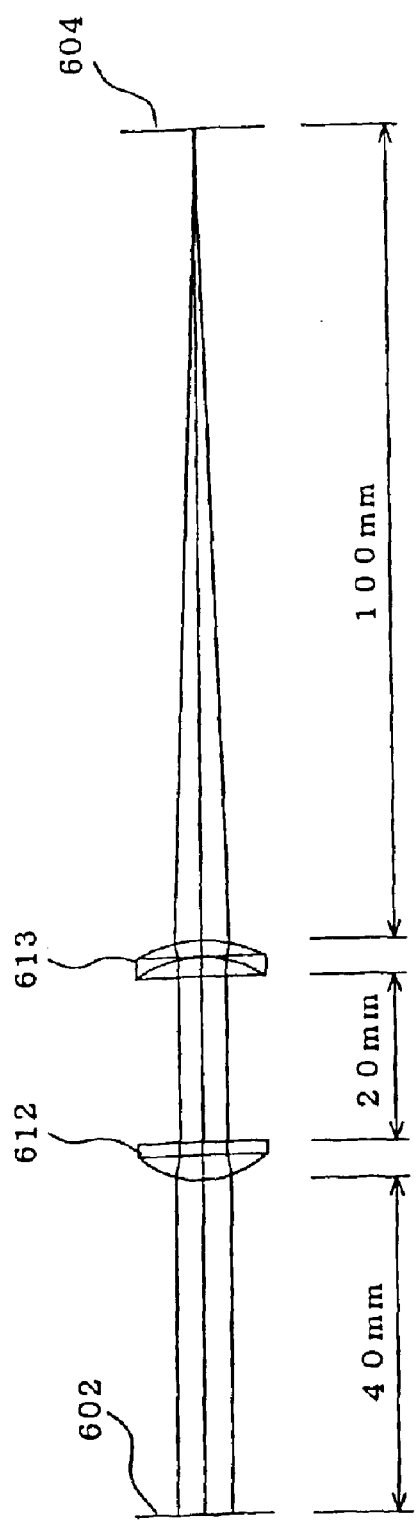
FIG. 21 is a view showing an optical layout of the laser processing apparatus of the example 4.

FIG. 21 shows an optical layout of a laser processing apparatus of the fourth example. The first and second refraction lenses 612 and 613 with the diffractive surfaces used in the optical layout have the following data. Note that the data show only an example.

The first refraction lens 612 with the diffractive surface has an incident surface (diffractive surface) with a radius of curvature of 7.74E−02, an outgoing surface with a radius of curvature of 3.02E−02, and a thickness of 3.00E+00. The second refraction lens 613 with the diffractive surface has an incident surface with a radius of curvature of −9.86E−02, an outgoing surface (diffractive surface) with a radius of curvature −5.43E−02, and a thickness 2.00E+00. Further, the first and second refraction lenses 612 and 613 with the diffractive surfaces have a diameter of 8.00E+00 and an interval therebetween of 2.00E+01.

Further, the diffractive surface of the first refraction lens 612 has a coefficient $r^2$ of +142.025716, a coefficient $r^4$ of +0.241539, and therefore a negative power. The diffractive surface of the first refraction lens 613 has a coefficient $r^2$ of −144.941195, a coefficient $r^4$ of −0.165726, and therefore positive power.

These first and second refraction lenses 612 and 613 with the diffractive surfaces are formed on a glass material of high quality by high-precision diamond-cutting process.

Further, the femto second laser and the branching diffraction element 602 used in the apparatus of the fourth example have the same specifications as those used in the third example.

Figure 22:
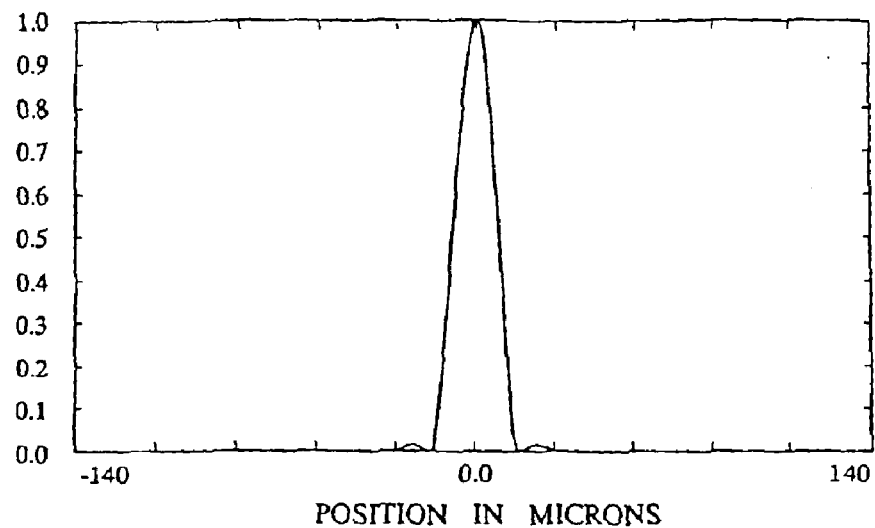
FIG. 22 is a graph showing a point image formed by the optical layout of the example 4.

When the femto second laser beam is branched and focused using the processing apparatus of the example 4, lateral and longitudinal aberrations are corrected, and the focused spots formed by an optical system of the apparatus have substantially the same shape and size regardless of the order of diffraction, as shown in, for example, FIG. 19. FIG. 22 shows a point image formed by the optical layout. When the array of the uniformly branched, focused spots is projected on a work 604, processed traces having the same shape and size can be obtained thereon. When the processing apparatus of the example 4 is used, the size of the processed traces is reduced at least by the correction of longitudinal chromatic aberration as compared with the case in which the processing apparatus of the example 3 is used.

EXAMPLE 5

Figure 23:
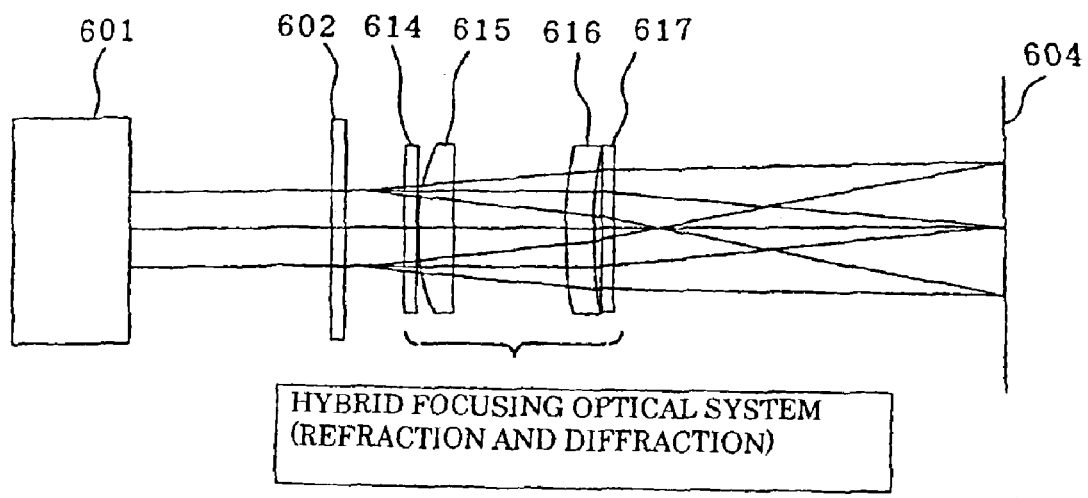
FIG. 23 is a view showing a schematic arrangement of a laser processing apparatus of an example 5.

FIG. 23 is a view showing an arrangement of a laser processing apparatus of an example 5 of the present invention. The apparatus is composed of a laser generator 601 for generating femto second laser pulses, a branching diffraction element 602 for branching the pulse laser beam from the laser generator 601 into a plurality of pulse laser beams, and a hybrid focusing optical system composed of a first diffractive surface 614, a first refraction lens 615, a second refraction lens 616, and a second diffractive surface 617. The example 5 is different from the example 4 in that the diffractive surfaces are separated from the refraction lenses and formed on flat sheets. Focusing characteristics and effects substantially the same as those of the example 4 can be obtained even if the example 5 is arranged as described above.

In this hybrid focusing optical system, the first diffractive surface 614 (having a negative power) is formed on one of the flat sheets on the outgoing surface thereof. The first refraction lens 615 is composed of a double-convex lens with no diffractive surface formed thereon. The second refraction lens 616 is composed of a double-concave lens with no diffractive surface formed thereon. The second diffractive surface 617 (having a positive power) is formed on the other of the flat sheets on the outgoing surface side thereof.

Figure 24:
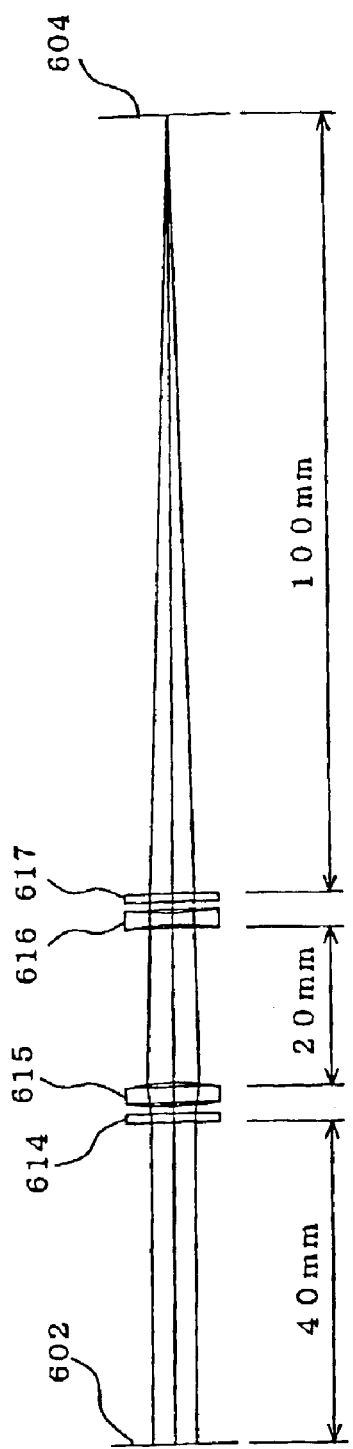
FIG. 24 is a view showing an optical layout of the laser processing apparatus of the example 5.

FIG. 24 shows the optical layout of the laser processing apparatus of the fifth example. The first and second diffractive surfaces (which are formed on first and second diffractive elements) 614 and 617 and the first and second refraction lenses 615 and 616 have data described below. Note that the data show only an example.

The first diffractive element 614 has a thickness of 1.2 mm and an interval between it and the first refraction lens 615 set to 1 mm; the first refraction lens 615 has a thickness of 3 mm, an incident surface with a radius of curvature of +0.020342932, an outgoing surface with a radius of curvature of −0.032665854, and an interval between it and the second refraction lens 616 set to 20 mm; the second refraction lens 616 has a thickness of 2 mm, an incident surface with a radius of curvature of −0.020098118, an outgoing surface with a radius of curvature of +0.02528779, and an interval between it and the second diffractive element 617 set to 1 mm; the second diffractive element 617 has a thickness of 1.2 mm; and each of the diffractive elements 614 and 617 and the first and second refraction lenses 615 and 616 has a diameter of 6 mm.

The first diffractive surface 614 has a coefficient $r^2$ of +152.19799, a coefficient $r^4$ of +0.093056, a coefficient $r^6$ of +5.156849E−05, a coefficient $r^8$ of +3.139228E−06 and thus a negative power. The second diffractive surface 617 has a coefficient $r^2$ of −153.011565, a coefficient $r^4$ of −0.062412, a coefficient $r^6$ of −4.54194E−05, a coefficient $r^8$ of −9.56396E−07, and thus a positive power.

These first and second diffractive surfaces 614 and 617 are formed on a substrate composed of high quality fused silica, and the like by, for example, laser drawing and ion etching. Further, these first and second refraction lenses 615 and 616 are formed on a glass material of high quality by high-precision diamond-cutting process.

Further, the femto second laser and the branching diffraction element 602 used in the apparatus of the fifth example have the same specifications as those used in the third example, respectively.

Figure 25:
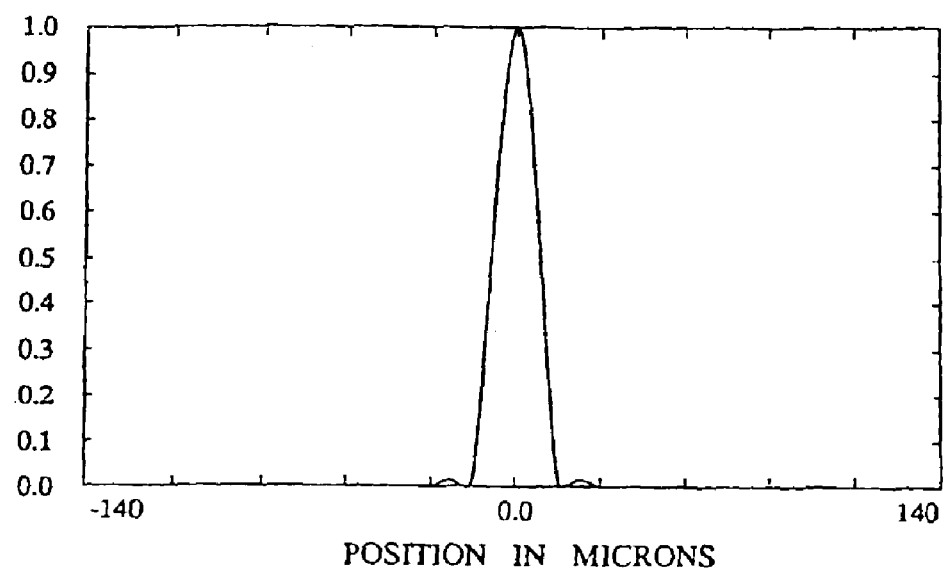
FIG. 25 is a graph showing a point image formed by the optical layout of the example 5.

When the femto second laser beam is branched and focused using the processing apparatus of the example 5, lateral and longitudinal chromatic aberrations are corrected similarly to the example 4, and the focused spots formed by the optical system of the apparatus have substantially the same shape and size regardless of the number of order of diffraction, as shown in, for example, FIG. 19. FIG. 25 shows a point image formed by the optical layout. When the array of the uniformly branched focuced spots impinges on a work 604, processed traces having the same size can be obtained thereon.

In particular, the laser processing apparatus of the example 4 or 5 can correct the chromatic aberration more sophisticatedly than the example 3 by combining the dispersive characteristics of the refraction elements and the dispersive characteristics of the diffractive elements, thereby processing accuracy can be improved as well as an effective process region can be expanded.

The embodiment 2 can also utilize a two-dimensional array of branched pulse laser beams, in addition to a one-dimensional array of branched pulse laser beams for processing materials.

While the processing performed using a single beam or a plurality of branched beams has been described in the embodiments 1 and 2, the spatial intensity distribution of pulses generated from the laser generator may be shaped in to a desired shape in the processing. In this case, the spatial pulse intensity distribution can be shaped as desired using a diffractive element. The said diffractive element may be provided as a diffractive element for shaping the pulse intensity distribution, or both branching function and shaping function may be given to a single diffractive element by multiplexing a phase function for pulse shaping to the branching diffraction element used in the examples 3 to 5.

Figure 26:
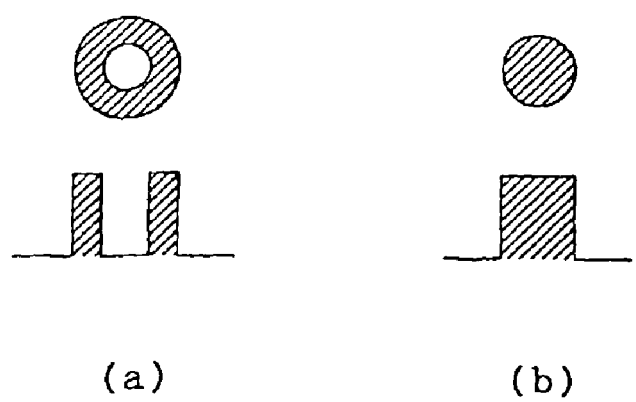
FIGS. 26A and 26B are views exemplifying shaped pulses to be used in laser processing.

While various types of shaped pulse are contemplated, a ring-like shaped pulse as shown in FIG. 26A and a circularly flat-tap shaped pulse as shown in FIG. 26B may be exemplified. Materials processing can be performed accurately and effectively without pollution and damage by laser-processing a work with the shaped pulses.

Embodiment 3 (Trepanning Processing Using a Single Beam or a Plurality of Branched Beams)

An embodiment 3 relates to trepanning processing with a laser. Conventional trepanning processing using a laser is performed by moving a laser focused spot making use of a galvano mirror, and the like combined therewith. However, it is very difficult to accurately perform the beam positioning by the galvano mirror, because of its complex positioning mechanism. To cope with the above problem, the inventors have developed an arrangement for moving the focused laser spot making use of a diffraction grating in place of the galvano mirror.

EXAMPLE 6

Figure 27:
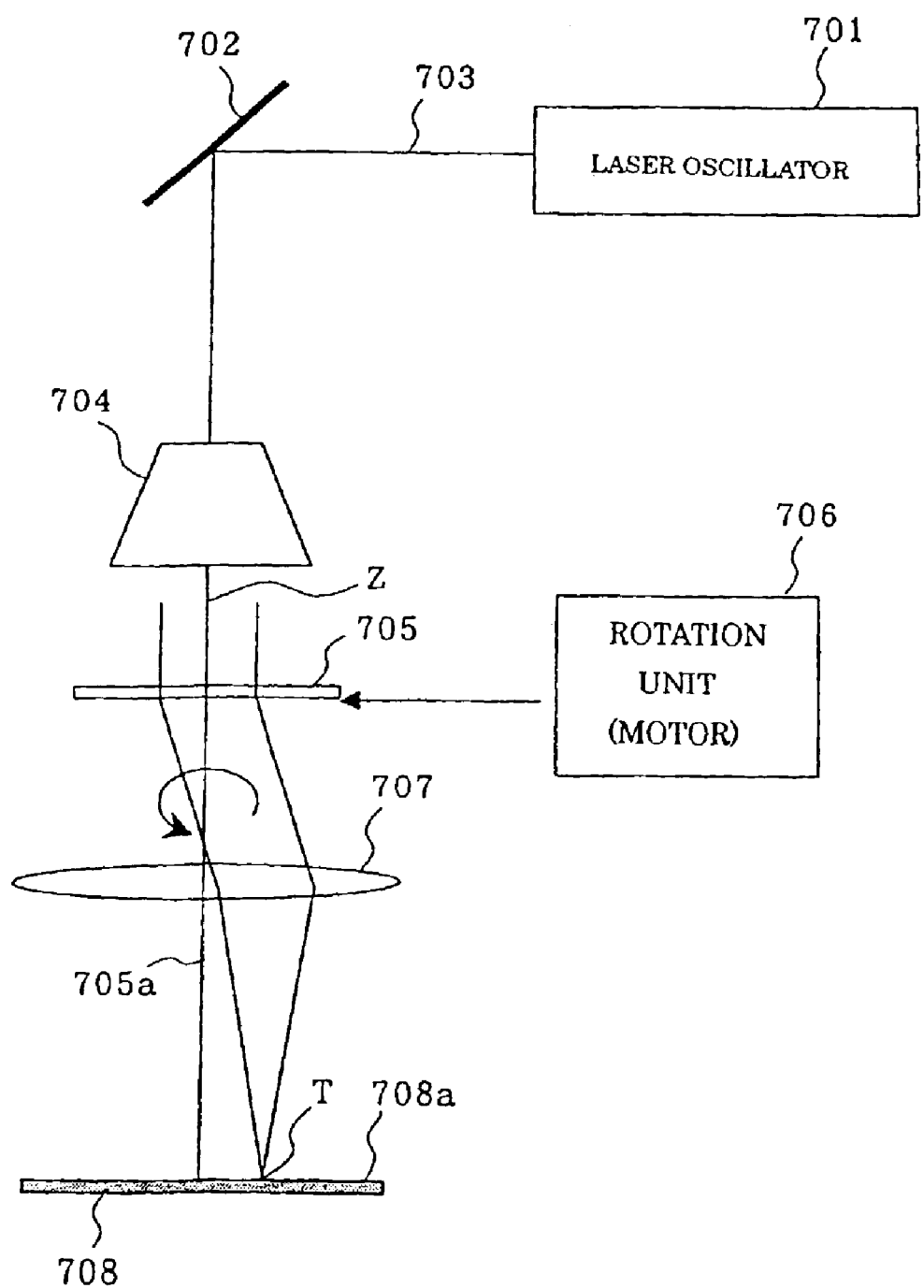
FIG. 27 is a view showing a schematic arrangement of a laser processing apparatus of an example 6.
Figure 28:
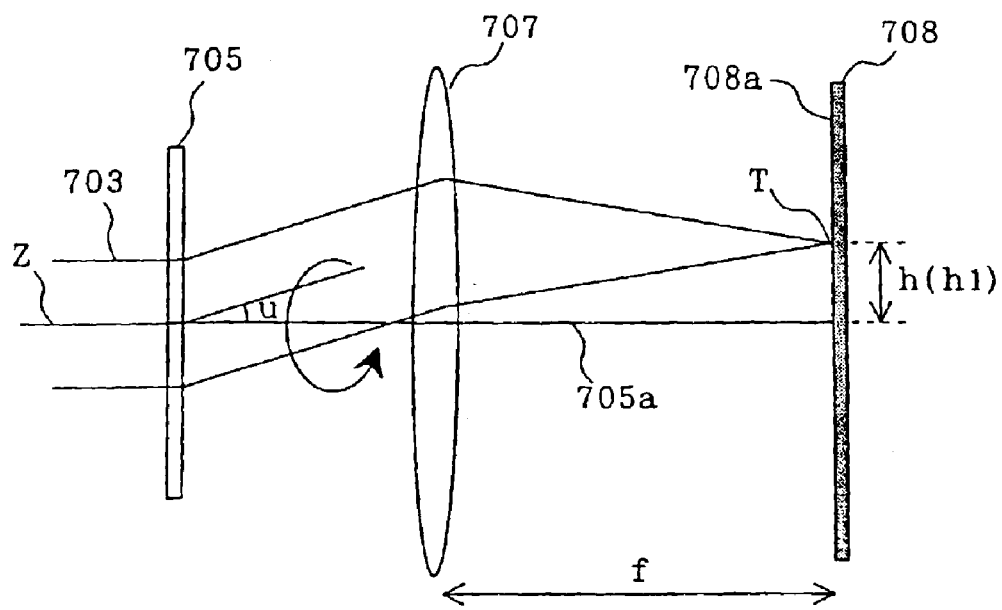
FIG. 28 is a view explaining an arrangement of a main portion of the laser processing apparatus of the example 6.

FIG. 27 is a view showing an arrangement of a laser processing apparatus used in trepanning processing, and FIG. 28 shows a view explaining a main portion of the apparatus. In FIG. 27, reference numeral 701 denotes a laser generator that generates a continuously oscillated laser beam, for example, YAG laser and the like, a pulsed laser beam having a relatively long pulse width, or ultra-short pulse of $10^{12}$ second or less such as femto second pulses any of which can be used to the trepanning processing. Reference numeral 702 denotes a totally-reflecting mirror disposed on a traveling path of the laser beam 703 from the laser generator 701 for reflecting the laser beam 703 to a work 708, and reference numeral 704 denotes a beam expander for expanding the width of the laser beam 703 reflected by the totally-reflecting mirror 702.

Reference numeral 705 denotes a diffractive element for diffracting the laser beam 703 from the beam expander 704. The diffractive element 705 has a rotational axis 705a at the center thereof, the rotational axis 705a is aligned with the optical axis Z of the laser beam 703 from the beam expander 704, and the diffractive element 705 turns around the rotational axis 705a as driver by a rotation unit such as a motor 706, and the like. Reference numeral 707 denotes a refraction lens acting as a focusing optical system interposed between the diffractive element 705 and the work 708 for focusing the laser beam 703 diffracted by the diffractive element 705 to impinge on the work 708.

Figure 32:
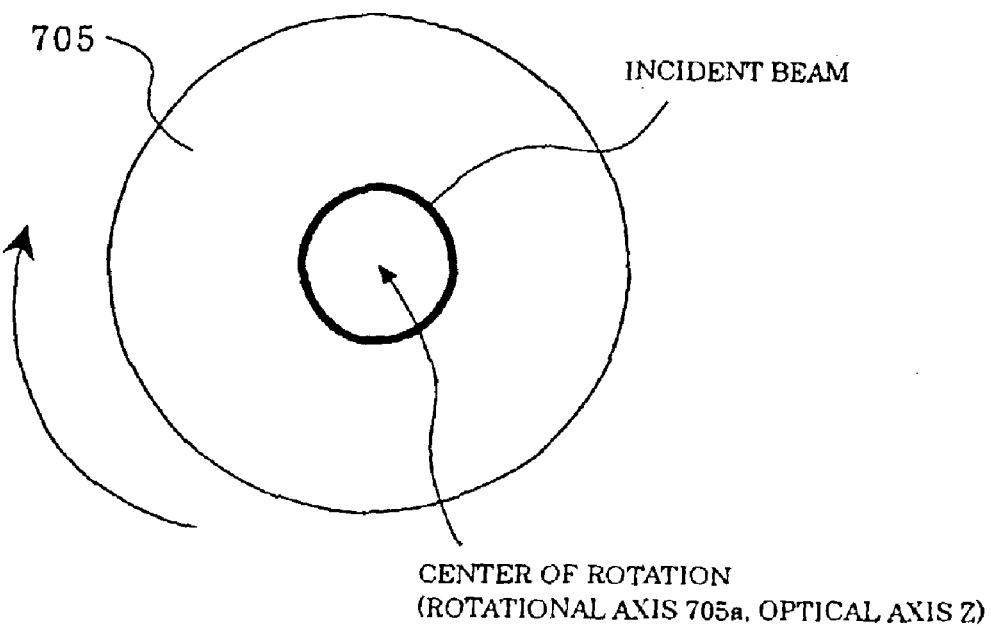
FIGS. 32A and 32B are views explaining the positioned relationships between the diffraction element according to the example 6 or 7 and the position of an incident beam.
Figure 32:
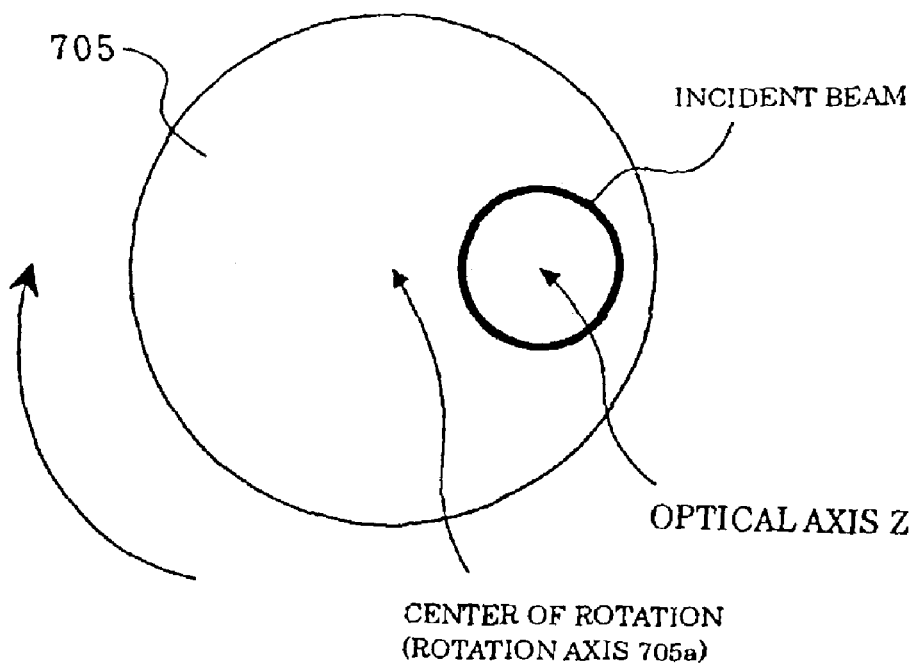
Figure 33:
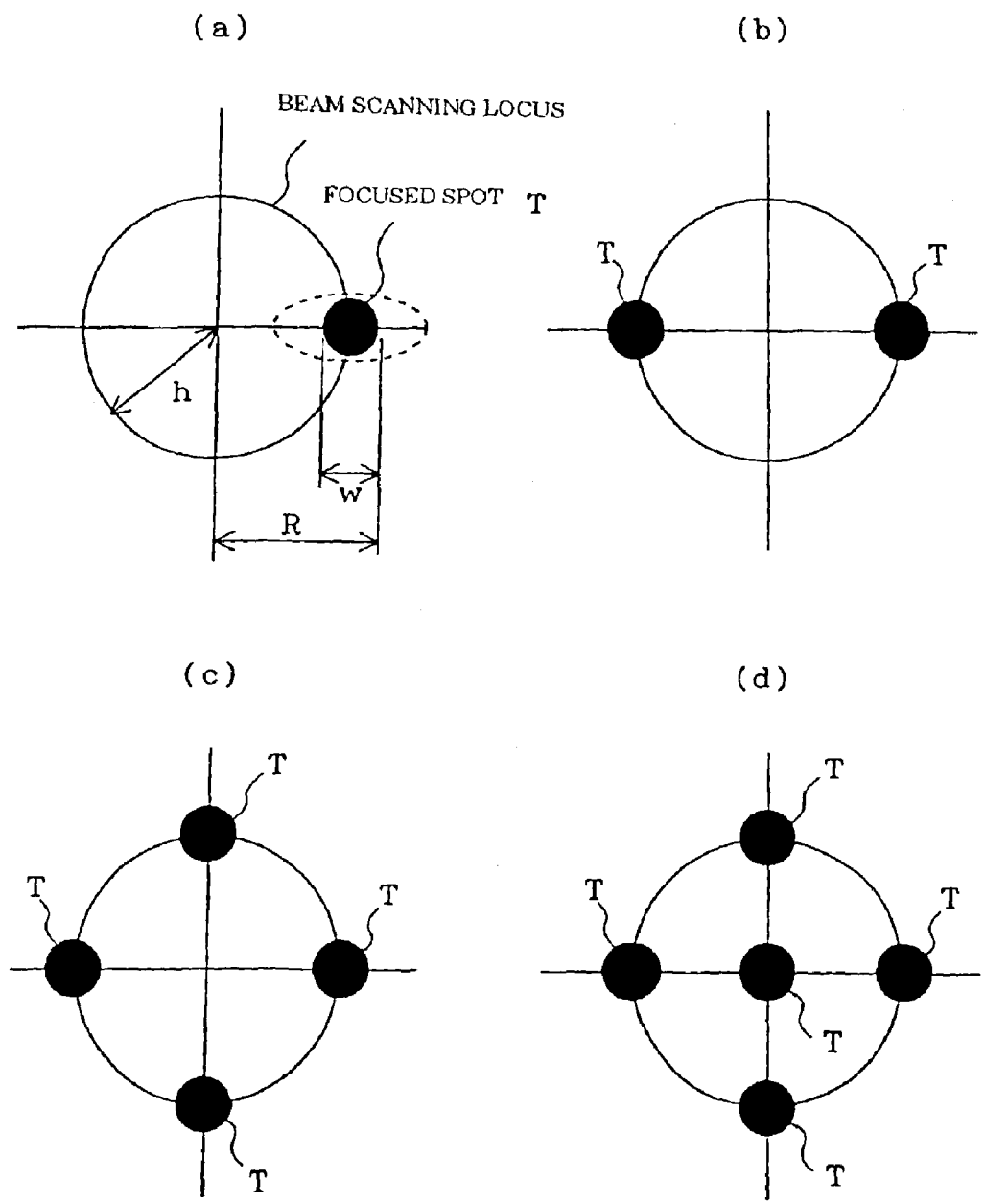
FIGS. 33A to 33D are views explaining positions where the diffracted laser beams are focused by the laser processing apparatuses of the examples 6 and 7.

When the trepanning processing is performed to the work 708 using the laser processing apparatus arranged as described above, the laser beam 703 is emanated from the laser generator 701, reflected by the totally-reflecting mirror 702, and caused to be incident on the diffractive element 705 after the laser beam 703 is expanded by the beam expander 704. At this time, the optical axis Z of the laser beam 703 incident on the diffractive element 705 is aligned with the rotational axis 705a of the diffractive element 705 as shown in FIGS. 28 and 32A. Then, the laser beam 703 incident on the diffraction element 705 is diffracted at a diffraction angle u by the relief patterns formed on the surface of the diffractive element 705, is focused by the refraction lens 707, and is projected on the work 708 so as to drill holes there on. As shown in FIG. 33A, the focused spot T of the diffracted laser beam 703 is located at a point on the circumference of a hole to be formed in the work 708. Then, the focused spot T is scanned along the circumference of the hole by rotating the diffractive element 705 using the motor 706 (refered to as a beam scanning locus in FIG. 33A), thereby the hole is formed in the work 708.

As shown in FIGS. 28 and 33A the circle along which the focused spot T moves has a radius h. When the trepanning processing is performed with the radius h, the radius R of the hole to be formed is determined by the following expression (16).

$$R=h+w/2 \qquad (16)$$

where, w shows the diameter of the focused spot T.

Accordingly, the hole size of the hole to be obtained is varied by adjusting the radius h of the circle along which the focused spot T moves, in other words, by adjusting the focal position h of the diffrected beam.

The position of the focused spot T on the work surface 708a 708 is determined by the following formula (17).

$$h=-fu \qquad (17)$$

where, h shows a focused spot position, f shows the focusing length of the refraction lens 707, and u shows a diffraction angle. However, there is the possibility that the position of the focused spot T is affected depending on the curvature of the wave front of the laser beam That is, the focused spot position may be sifted to a position in front of the work 708 or to an opposite position in back of the work surface 708. When the radius of curvature of the wave front is shown by a, a focused position h1 is determined by the following equation (18).

$$h1=-fu/(1-f/a) \qquad (18)$$

It can be seen from the relation (18) that the position of the focused spot T can be adjusted by adjusting the radius of curvature a and thus the hole diameter can be adjusted accordingly.

With the above arrangement, a laser processing apparatus for performing the trepanning processing can be arranged more simply as compared with a conventional apparatus, and moreover the trepanning processing can be performed very accurately by a simper beam-positioning mechanism.

EXAMPLE 7

Figure 29:
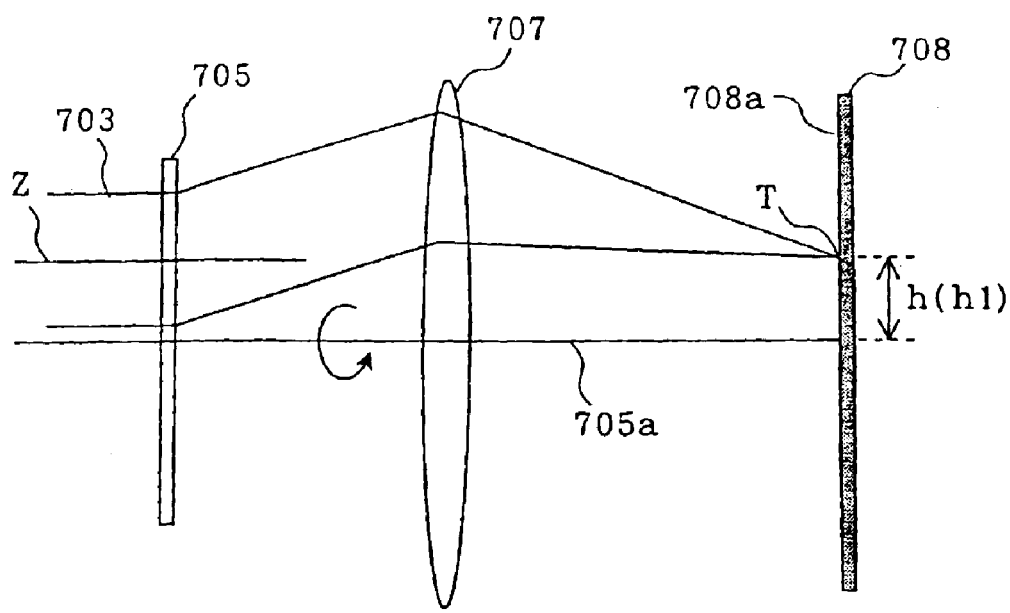
FIG. 29 is a view explaining an arrangement of a main portion of a laser processing apparatus of an example 7.

FIG. 29 is a view explaining an arrangement of a main portion of another laser processing apparatus used in the trepanning processing. The example 7 is different from the example 6 in that the optical axis Z of the laser beam 703 from the beam expander 704 is not aligned with the rotational axis 705a of the diffractive element 705 and that the focused spot T moves around the rotational axis 705a of the diffractive element 705 as the diffractive element 705 turn abont the rotational axis as shown in FIGS. 29 and 32B.

With this arrangement, almost the same causes and effects as those of the example 6 can be obtained. Further, the position of the focused spot T can be to obtain the desired hole diameter by controlling the radius of curvature following the expression (18), thereby the trepanning processing can be performed very accurately and simply.

EXAMPLE 8

Figure 30:
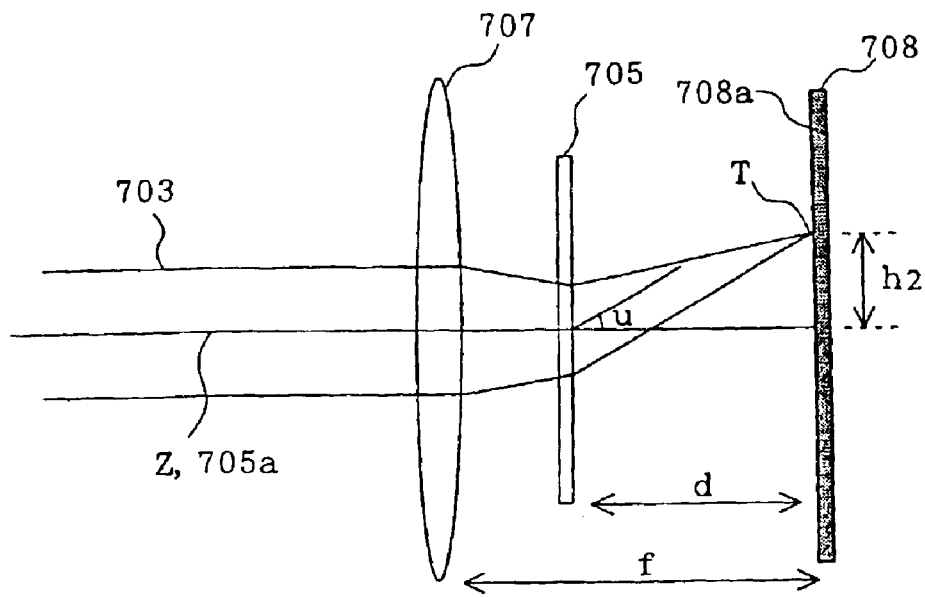
FIG. 30 is a view explaining an arrangement of a main portion of a laser processing apparatus of an example 8.

FIG. 30 is a view explaining an arrangement of a main portion of still another laser processing apparatus used in the trepanning processing. The example 8 is different from the example 6 in that the diffractive element 705 is interposed between the refraction lens 707 and the work 708 so that the position at which the diffractive element 705 is disposed can be adjusted with respect to the work 708.

In this arrangement, the focused spot position h2 T can be changed by adjusting the distance from the diffractive element 705 to the work 708. That is, the focal position h2 can be determined by the following equation (19).

$$h2 = -du \qquad (19)$$

where, d is the distance from the diffractive element 705 to the focused spot.

From the relation (19), the focal position h2 can be made farther from the optic axis by increasing the distance d, whereas the focal position h2 can be made closer to the optic axis by reducing the distance d.

Accordingly, the focused spot T can be located exactly to a desired position by adjusting the distance from the diffractive element 705 to the work 708, thereby the trepanning processing can be performed with a higher accuracy.

EXAMPLE 9

Figure 31:
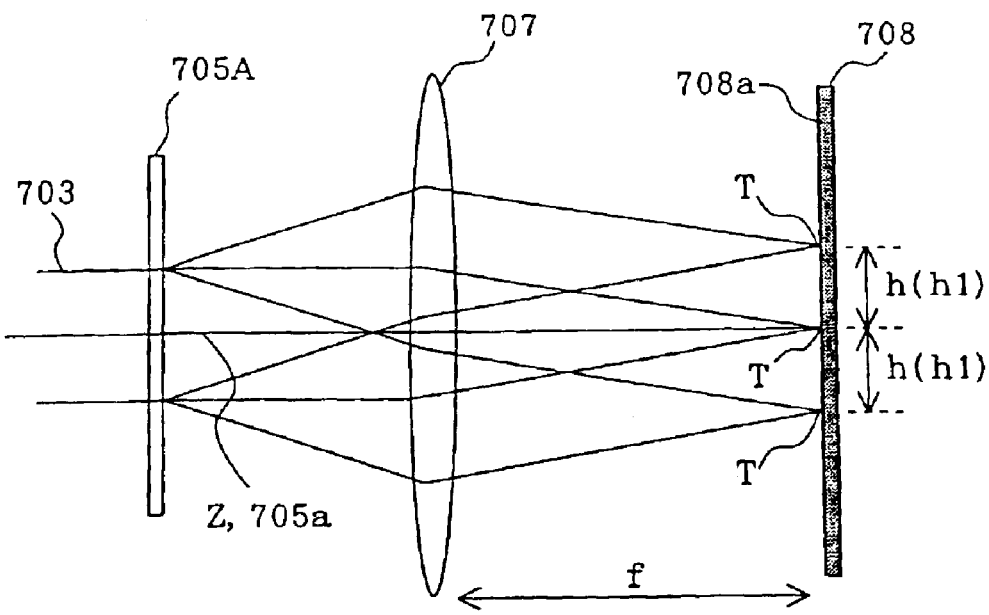
FIG. 31 is a view explaining an arrangement of a main portion of a laser processing apparatus of an example 9.

FIG. 31 is a view explaining an arrangement of a main portion of a further laser processing apparatus used in the trepanning processing. In the example 9, a diffractive element 705A having a both beam-deflecting funtion and beam branching function is used in place of the diffractive element 705, which has only beam-deflecting function, and a single laser beam generated by the laser generator 701 is diffracted and branched by the diffractive element 705A and hence a plurality of laser beams 703 are produced. Then, a plurality of focusing spots, created by focusing the plurality of branched laser beams with a refraction lens 707, impinge on the work 708.

The number of laser beams 703 impinging on the work 708 subjected to the trepanning processing may be one or more depending upon the selection of how many and which orders of diffraction by the diffractive element 705A.

Several examples of the laser beam 703 will be shown in FIGS. 33A to 33D. FIGS. 33A to 33C show examples in which one, two, and four focused spots T are formed on the circumference (beam scanning locus) of a hole to be formed. Increasing the number of the laser beams 703 impinging on the work 708 raises the effective processing speed two and four times. Further, FIG. 33D shows the array of the focused spots T that enables to perform the processing both along the hole circumference and at the hole center simultaneously by assigning some light energy to the zeroth-order laser beam. This arrangement will further improve the processing speed.

Further, various other examples of the layout of the focused spots are contemplated in addition to the above examples, which can be realized easily by selecting the orders of diffraction.

Figure 34:
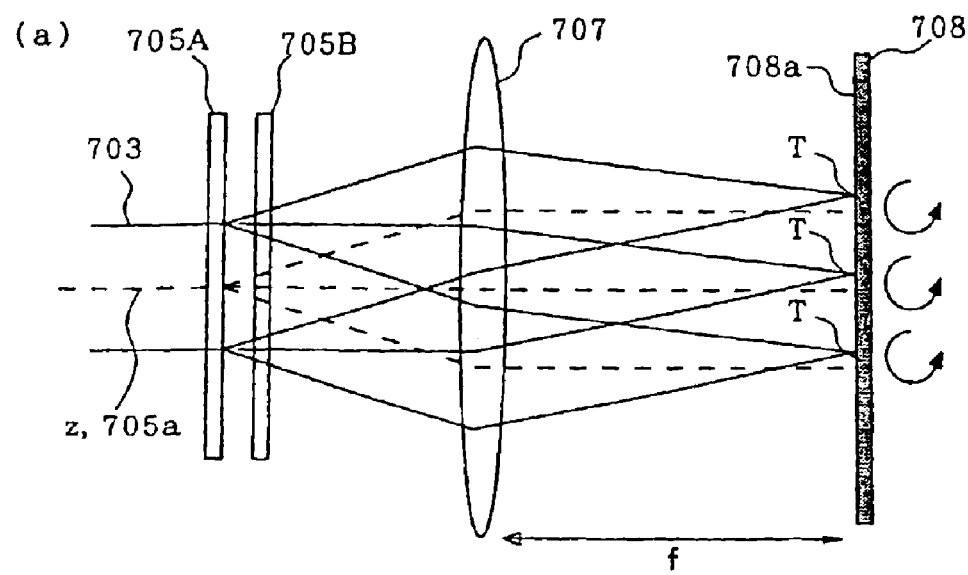
FIGS. 34A and 34B are views showing modifications of the main portion of the laser processing apparatus of the example 9.
Figure 34:
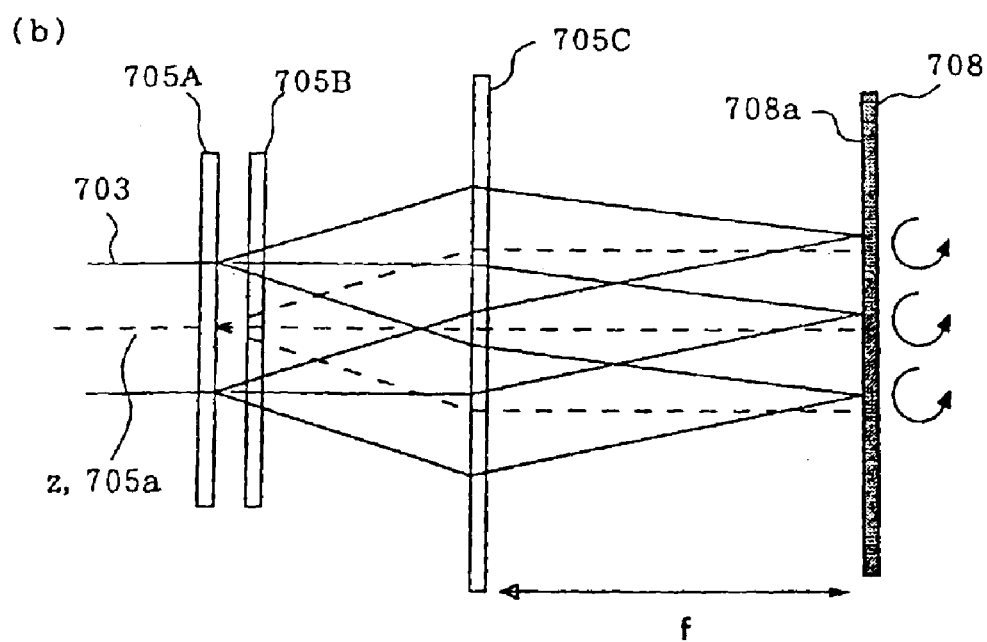

For example, FIG. 34A shows a modified example of the laser processing apparatus shown in FIG. 31 that is composed of a branching diffractive element 705A for generating a plurality of the branched laser beams 703 and a second diffractive element 705B interposed between the diffraction element 705A and a refraction lens 707 for diffracting each of the plurality of laser beams 703 branched by the diffractive element 705A and generating diffraction patterns necessary for processing the work at multiple points.

Here, the focused spots are located on the respective circumferences of a plurality of holes to be formed because of the diffraction patterns generated by the second diffractive element 705B. Since the branching diffractive element 705A stays still and the second diffractive element 705B turns around its axis, the plurality of holes can be simultaneously formed because of the rotation of the diffraction patterns. With this arrangement, different positions on a work can be simultaneously subjected to the trepanning processing.

FIG. 34B shows the laser processing apparatus of FIG. 34A that is provided with the third diffractive element 705C in place of the refraction lens 707 to focus the plurality of laser beams 703 emanating from the second diffractive element 705B in order to generate as mary focus laser beams spots on the work 708. In this case, the branching diffractive element 705A and the third diffractive element 705C stand still and the second diffractive element 705B turns. The same effects as that of the laser processing apparatus shown in FIG. 34A also can be achieved by this arrangement.

EXAMPLE 10

Figure 35:
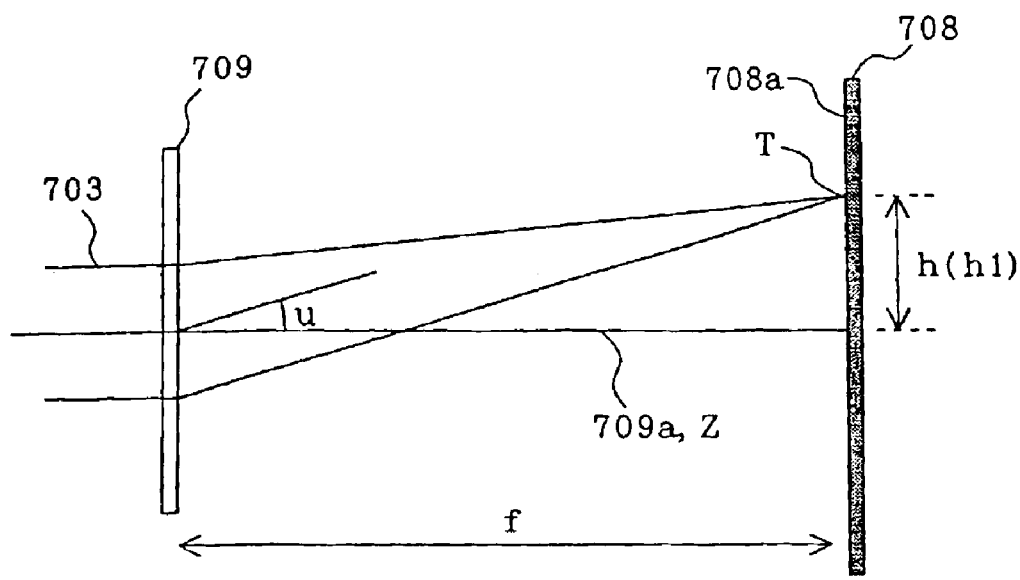
FIG. 35 is a view explaining an arrangement of a main portion of a laser processing apparatus of an example 10.

FIG. 35 is a view explaining an arrangement of a main portion of a still further laser processing apparatus used in the trepanning processing. In this arrangement, a diffraction element 709 for diffracting and focusing the laser beam 703 is provided in place of the diffractive element 705 and the refraction lens 707 of the example 6. The diffractive element 709 has such a phase structure that provides both beam-focusing action and beam-fan out action. Further, the rotational axis 709a of the diffractive element 709 is aligned with the optical axis Z of the laser beam 703. In this arrangement, if the rotational axis 709a of the diffractive element 709 is set off the optical axis Z of the laser beam 703 and, unnecessary aberration is provided to the focused spot T and the shape thereof is deformed. Thus, it is desirable that the rotational axis 709a of the diffraction element 709 be aligned with the optical axis Z of the laser beam 703.

When the trepanning processing is performed to the work 708 using the laser processing apparatus of the example 10, the laser beam 703 generated by the laser generator 701 is reflected by the totally-reflecting mirror 702, and caused to be incident on the diffractive element 709 after the width of the laser beam 703 is expanded by the beam expander 704 similarly to the example, 6. Then, the laser beam 703 incident on the diffractive element 709 is diffracted at the diffraction angle u and focused and then projected on the work 708 at the position of a hole to be formed. The focused spot T of the impinging laser beam 703 is located on the hole circumference on the work 708. Then, the focused spot T is moved along the circumference of the hole by rotating the diffraction element 709 with the motor 706, thereby the hole is formed in the work 708.

As described above, the laser processing apparatus can be more simply arranged by performing the diffracting action and the focusing action by the single diffractive element 709, which permits the apparatus to be adjusted and handled easily.

Note that it is also possible to deliver a plurality of laser beams 703 to the work 708 in the same manner as the example 9 and to increase a processing speed by designing the layout of the focused spots T of the laser beam 703.

As explained before when ultra-short pulse lasers such as a femto second pulse laser is branched with a diffractive element, the branched laser beams can hardly be focused because chromatic aberrations occur due to a wide wavelengthbandwidth of the laser. To cope with this problem, in cases that an ultra-short pulse laser is used in the trepanning processing in the examples 6 to 10, processing accuracy can be secured with the laser beams well focused as chromatic aberratios or chromatic aberrations and pulse extension are corrected by using the focusing optical system of the example 1 or 2 explained in the embodiment 1 as the focusing optical system of the examples 6 to 10.

EXAMPLE 11

Figure 36:
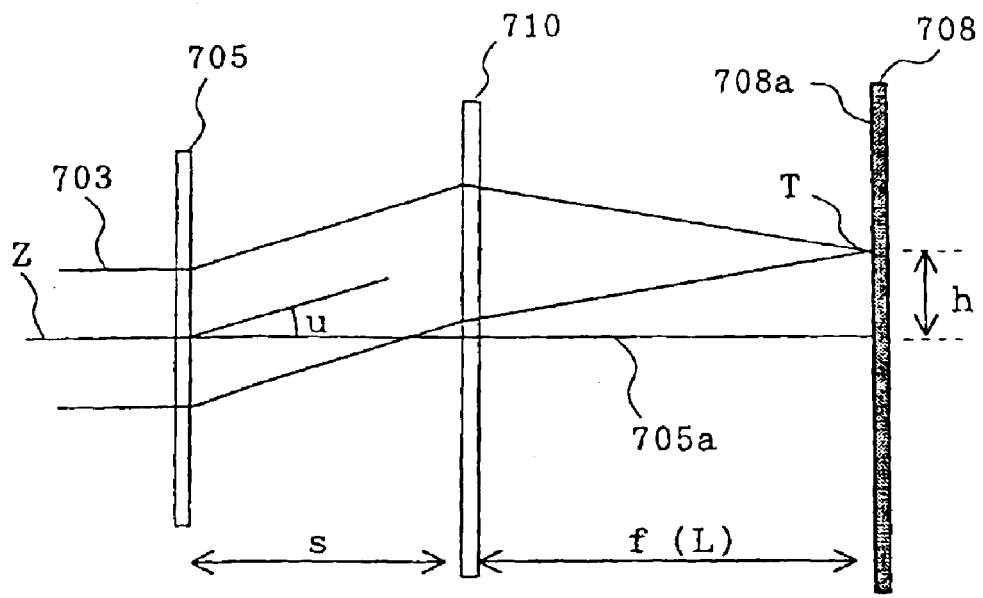
FIG. 36 is a view explaining an arrangement of a main portion of a laser processing apparatus of an example 11.

FIG. 36 is a view explaining an arrangement of a main portion of a yet still further laser processing apparatus used in trepanning processing using an ultra-short pulse laser. In the example 11, the refraction lens 707 in the example 6 is substituted by a focusing diffractive element 710. According to the example 11, the lateral chromatic aberration of the focused spot T incident on the work 708 can be corrected by adjusting the disposition of the two diffracting and focusing elements 705 and 710. Although the case in which the rotating axis 705a of the first diffracting element 705 is aligned with the optical axis Z of the laser beam 703 is shown here, the rotating axis 705a may be set off the rotating axis 705a.

When the two diffractive elements 705 and 710 are disposed following the theory explained in the example 3 of the embodiment 2 that the distance from the beam-deflecting diffractive element 705 to the focusing diffraction element 710 is set equal to the distance from focusing diffraction element 710 to a work surface to be processed 708a, lateral chromatic aberration caused on the diffracted femto second pulse laser beams can be corrected. Actually, no problem occurs even if the above condition is not perfectly met. How strictly the positional alignment must be performed may be determined from a necessary size of the process region and a necessary uniformity of the process quality in that region.

The lateral aberration can be corrected by disposing the diffractive element 705 for beam deflecting and the diffraction element 710 for beam focusing under the above condition of the optimum element interval, thereby a circular focused spot T or a plurality of focused circular spots T having a uniform size can be obtained even if the femto second pulse laser is used, thereby highly accurate trepanning processing can be performed.

Although the case in which the work 708 is processed with the single beam has been explained here, the laser beam 703 may be branched using the diffractive element 705 to generate plurality of the laser beams 703 which impinge on the work 708 to process it.

EXAMPLE 12

Figure 37:
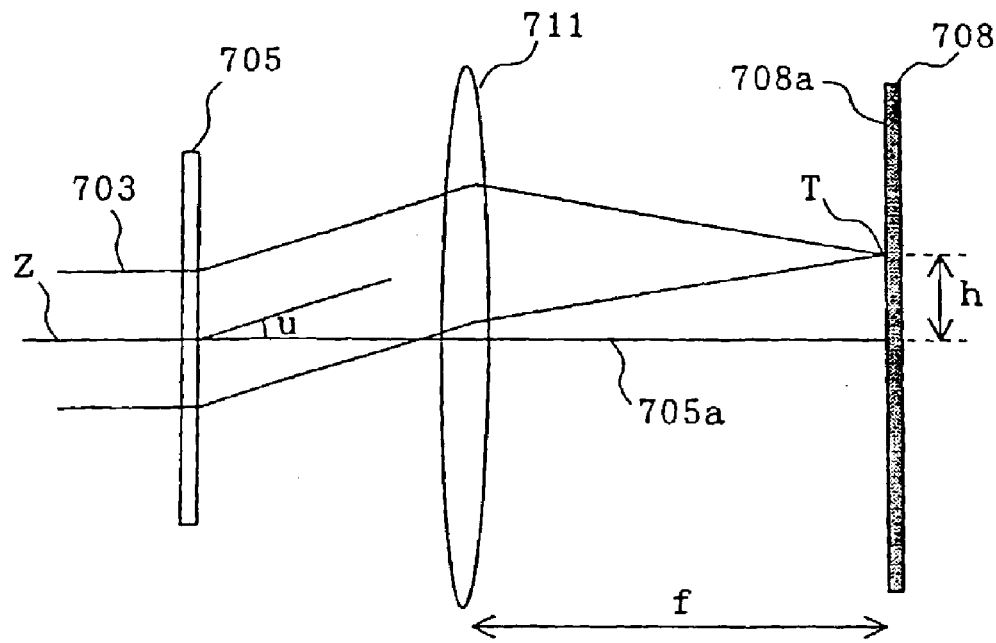
FIGS. 37A and 37B are views explaining arrangements of optical systems acting as main portions of laser processing apparatuses of examples 12 and 13.
Figure 37:
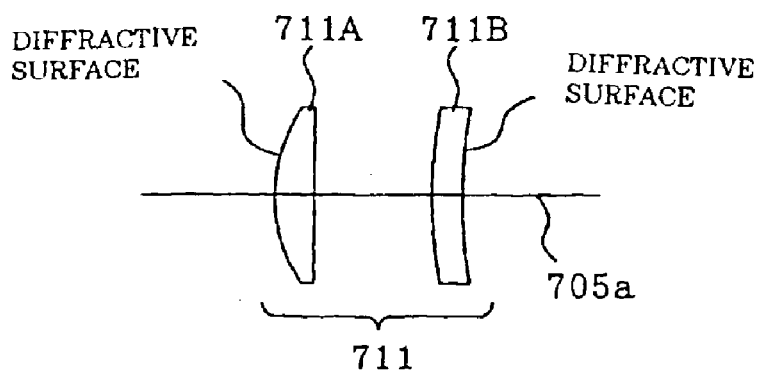

FIG. 37A is a view explaining an arrangement of a main portion of another laser processing apparatus used in trepanning processing using on ultra-short pulse laser. In the example 12, the operation of the refraction lens 707 in the example 6 is substituted by a hybrid focusing optical system 711 composed of a first refraction lens 711A with a diffractive surface and a second refraction lens 711B with a diffractive surface shown in FIG. 37B.

In the hybrid focusing optical system 711, the first refraction lens 711A with the diffractive surface is composed of a convex/concave spherical lens (positive power) and has the diffractive surface (negative power) formed on the front surface thereof. The second refraction lens 711B with the diffractive surface is composed of a concave/convex spherical lens (negative power) and has the diffractive surface (positive power) formed on the back surface thereof. Then, lateral and longitudinal aberrations of the focused spot T of the laser beam 703 incident on the work 708 ore corrected by optimizing the dispersive relationship between a plurality of the diffractive surfaces and a plurality of the refractive surfaces of the hybrid focusing optical system 711. These first and second refraction lenses with the diffractive surfaces are formed on a glass material of high quality by high precision cutting process. Although the case in which the rotating axis 705a of the diffractive element 705 is aligned with the optical axis Z of the laser beam 703 has been shown, the rotating axis 705a may be set off the optical axis Z.

When the trepanning processing is performed to the work 708 using the laser processing apparatus of the example 12, the femto second pulse laser beam 703 generated by the laser generator 701 is reflected by the totally-reflecting mirror 702 and caused to be incident on the diffractive element 705 after the width of the laser beam 703 is expanded by the beam expander 704 similarly to the example 6. Then, the femto second pulse laser beam 703 incident on the diffractive element 705 is diffracted at the diffracting angle u.

Longer wavelengths of the diffracted femto second pulse laser beam 703 have a longer diffraction angle of u, thereby these wavelength components of the femto second pulse laser beam 703 travel outward causing longitudinal and lateral aberrations. To correct the aberrations, it is necessary to provide the hybrid focusing optical system 711 with a large lateral aberration. That is, the systems magnification need to be set smaller for longer walelengths. The following relationship is required between a wavelength $\lambda$ and a focal length f to the wavelength.

$$f = \text{constant} \tag{20}$$

The diffraction angle u is greatly changed even by a slight amount of change $\Delta\lambda$ of the wavelength. Therefore, it is necessary to set a difference $\Delta f$ of a focusing length to a given wavelength difference so that longitudinal and lateral chromatic aberrations caused on the branched laser beams 705 can be corrected, by using a diffractive surface having a large dispersive power. Meanwhile, the branched laser beam must be focused at the same point regardless of wavelength. As described above, since a considerably large amount of dispersive power must be produced by the hybrid focusing optical system 711, an arrangement using only refraction lenses requires many surfaces. To overcome this problem, each of the refraction lenses is provided with the diffractive surface.

The focusing length f of this focusing optical system in its effect is determined by the following relation (21).

$$1/f = 1/f1 + 1/f2 - d/(f1\ f2) \tag{21}$$

where, f1 and f2 show the focusing distances of the first and second refraction lenses 711A and 711B with the diffractive surfaces and are determined by the following equations (22-1) and (22-2).

$$1/f1=1/f1r+1/f1d \qquad (22\text{-}1)$$

$$1/f2=1/f2r+1/f2d \qquad (22\text{-}2)$$

where, f1r and f1d show the focusing distance of the refraction lens and the focusing distance of the diffractive surface of the first refraction lens 711A with the diffractive surface, and f2r and f2d show the focusing distance of the refraction lens and the focusing distance of the diffractive surface of the second refraction lens 711B with the diffractive surface. The differences $\Delta f1$ and $\Delta f2$ of the focusing distances of these lenses are determined by the following equations (23-1) and (23-2).

$$\Delta f1 = f1^2[(-\Delta n/(n-1))/fr1 + (-\Delta \lambda/\lambda)/fd1] \qquad (23\text{-}1)$$

$$\Delta f2 = f2^2[(-\Delta n/(n-1))/fr2 + (-\Delta \lambda/\lambda)/fd2] \qquad (23\text{-}2)$$

Note that the overall $\Delta f$ is determined from $\Delta f1$ and $\Delta f2$ described above. Then, $\Delta f1$ and $\Delta f2$ are determined from the design of the refraction lenses and the diffractive surfaces formed thereon.

Decreasing in the distance from the first refraction lens 711A with the diffractive surface to the second refraction lens 711B with the diffractive surface results in a high dispersive power, thereby the focusing lengths of the lenses are reduced, whether they may be refractive or diffractive. Inversely, increasing in the distance from the first refraction lens 711A with the diffractive surface to the second refraction lens 711B with the diffractive surface reduces the magnitude of necessary dispersive power, thereby the focusing lengths of the lenses are increased. Accordingly, it is desirable to take as large a value as possible for the distance from the first refraction lens 711A with the diffractive surface to the second refraction lens 711B with the diffractive surface because doing so makes the structure of the diffractive surfaces somewhat coarse, which permits the diffractive surfaces to be produced easily.

With this arrangement, lateral and longitudinal aberrations caused on the femto second pulse laser beams diffracted by the diffractive element 705 are canceled and corrected by the diffracting and refracting actions of the hybrid focusing optical system 711. With this operation, a circularly focused spot T and a plurality of circulaly focused spots T having a uniform size, both of which have no chromatic aberration, can be obtained even if a femto second pulse laser is used, thereby highly accurate trepanning processing can be performed.

EXAMPLE 13

In an example 13, the diffractive surfaces and the refraction surfaces of the hybrid focusing optical system 711 arranged in the example 12 are composed of different elements, respectively. In this hybrid focusing optical system, a first diffractive surface (having negative power) is formed on a flat sheet on the back surface thereof. A first refraction lens is composed of a double-convex lens and has no diffractive surface formed thereon. A second refraction lens is composed of a double-concave lens and has no diffractive surface formed thereon. The second diffractive surface (having positive power) is formed on a flat sheet on the back surface thereof. Laser focusing characteristics and their effects, which are substantially the same as those of the example 12, can be obtained even in the arrangement as described above.

The dispersing characteristics due to refraction and the dispersing characteristics due to diffraction in the laser processing apparatuses of the examples 12 and 13, are combined to work together so that chromatic aberrations can be corrected better than the example 6 and thereby the processing accuracy can be further improved.

Further, the processing with a plurality of branched beams can dso be performed in the examples 12 and 13 in accordance with the example 9, in addition to the process with a single laser beam.

According to the present invention, longitudinal and lateral aberrations are cancelled or sufficiently reduced because the diffractive dispersions due to diffractive elements and the refractive dispersions due to refractive elements occur in the processing performed with a single laser beam from on ultra-short pulse laser, and in addtion pulse extension due to the said dispersions can also be suppressed to a sufficiently small level. Therefore, the processing accuracy can be improved.

When different positions are processed simultaneously with plural laser beams branched from an ultra-short pulse laser beam, an array of focused spots to be used for processing, which are obtained from the said branched pulse beams, can also be prevented from being deformed because of chromatic aberration. Further, it is possible to perform the processing uniformly in a wide range with a pinpoint accuracy making use of the plurality of focused spots.

Furthermore, the trepanning processing using a laser beam can be performed with a pinpoint accuracy by a simple arrangement because the focused beam spot is moved on a circumference by rotating the diffractive element. In particular, when an ultra-short pulse laser is used, the trepanning processing can be performed with a pinpoint accuracy by focusing a laser beam into a circular spot by correcting chromatic aberrations or by correcting both chromatic aberrations and pulse extension in both of the two cases: one with a single beam used and the other with a plurality of branched beams used.

Accordingly, the method and apparatus of the present invention can be applied to the processing and manufacturing of various parts performed using a ultra-short pulse laser, and, in particular, to a variety type of micro machining applications.

What is claimed is:

1. A laser processing apparatus having a pulse laser focusing optical system, for performing the processing by projecting a beam delivered through the focusing optical system on a work, wherein the focusing optical system comprising:
   at least a pair of a diffractive surface and a refractive surface,
   the at least a pair of a diffractive surface and a refractive surface correcting chromatic aberration.

2. The laser processing apparatus according to claim 1, wherein the focusing optical system comprises a refraction lens having a diffractive surface.

3. The laser processing apparatus according to claim 1, wherein the focusing optical system comprises a sheet having a diffractive surface and a refraction lens.

4. The laser processing apparatus according to claim 1, comprising a pulse shaping diffractive element for shaping the spatial intensity distribution of the pulse laser beam to a predetermined shape.

5. A laser processing apparatus comprising:
   a laser generator for generating pulse laser beam;
   a branching diffraction element for branching the pulse laser beam generated by the laser generator into a plurality of pulse laser beams; and
   a focusing optical system for focusing the plurality of laser beams branched by the branching diffractive element after correcting chromatic aberration caused on the branched beams.

6. The laser processing apparatus according to claim 5, wherein a focusing diffractive element having a focusing action is provided as the focusing optical system, and the distance between the branching diffractive element and the focusing diffractive element is set approximately equal to the focusing length of the focusing diffractive element.

7. The laser processing apparatus according to claim 5, wherein an optical system comprising at least two groups each having refracting and diffracting actions is disposed as the focusing optical system.

8. The laser processing apparatus according to claim 7, wherein a refraction lens having at least one diffractive surface is provided as a group of the optical system having the refracting and diffracting actions.

9. The laser processing apparatus according to claim 7, wherein at least one diffractive surface and a refraction lens formed in a member different from a member to which the diffractive surface is formed are provided as a group of the optical system having the refracting and diffracting actions.

10. The laser processing apparatus according to claim 8, wherein the optical system comprising the two groups comprises a first group and a second group, the diffractive surface of the first group has negative power, the refraction lens of the first group has positive power, the refraction lens of the second group has negative power, and the diffractive surface of the second group has positive power, respectively.

11. The laser processing apparatus according to claim 5, wherein a phase function for shaping the spatial intensity distribution of the pulse laser beam to the predetermined shape is multiplexed to a phase distribution for branching the pulse laser beam of the branching diffractive element.

12. A laser processing apparatus comprising:
a laser generator for generating pulse laser beam;
a beam deflecting diffractive element for diffracting the pulse laser beam generated by the pulse generator;
a focusing optical system for correcting chromatic aberration due to the wavelength band of the pulse laser beam diffracted by the beam deflecting diffraction element and focusing the pulse laser; and
rotation means for rotating the diffractive element.

13. The laser processing apparatus according to claim 12, wherein the rotation means rotates thereby the moving focused spot of the laser beams diffracted by the beam deflecting diffraction element.

14. The laser processing apparatus according to claim 12, further comprising a branching diffractive element for branching the pulse laser generated by the laser generator into a plurality of beams, wherein the beam deflecting diffraction element diffracts the plurality of branched beams.

15. The laser processing apparatus according to claim 12, wherein the optical axis of the laser beam incident on the beam deflecting diffractive element is set to agree with the center of rotation of the beam deflecting diffractive element.

16. The laser processing apparatus according to claim 12, wherein the optical axis of the laser beam incident on the beam deflecting diffractive element is set off the center of rotation of the beam deflecting diffractive element.

17. The laser processing apparatus according to claim 12, wherein a focusing diffractive element having a focusing action is provided as the focusing optical system, and the distance between the beam deflecting diffractive element and the focusing diffractive element is set approximately equal to the focusing length of the focusing diffractive element.

18. The laser processing apparatus according to claim 12, wherein an optical system comprising at least two groups each having refracting and diffracting actions is disposed as the focusing optical system.

19. The laser processing apparatus according to claim 18, wherein a refraction lens having at least one diffractive surface is provided as a group of the optical system having the refracting and diffracting actions.

20. The laser processing apparatus according to claim 18, wherein at least one diffractive surface and a refraction lens formed in a member different from a member to which the diffractive surface is formed are provided as a group of the optical system having the refracting and diffracting actions.

* * * * *